United States Patent
Ohmuro et al.

(10) Patent No.: US 8,320,391 B2
(45) Date of Patent: Nov. 27, 2012

(54) ACOUSTIC SIGNAL PACKET COMMUNICATION METHOD, TRANSMISSION METHOD, RECEPTION METHOD, AND DEVICE AND PROGRAM THEREOF

(75) Inventors: Hitoshi Ohmuro, Kodaira (JP); Takeshi Mori, Higashiyamato (JP); Yusuke Hiwasaki, Kodaira (JP); Akitoshi Kataoka, Nerima-ku (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1273 days.

(21) Appl. No.: 10/584,833

(22) PCT Filed: May 10, 2005

(86) PCT No.: PCT/JP2005/008495
§ 371 (c)(1),
(2), (4) Date: Jun. 27, 2006

(87) PCT Pub. No.: WO2005/109401
PCT Pub. Date: Nov. 17, 2005

(65) Prior Publication Data
US 2009/0103517 A1    Apr. 23, 2009

(30) Foreign Application Priority Data
May 10, 2004  (JP) .................. 2004-140117

(51) Int. Cl.
  *H04L 12/56*  (2006.01)
  *G10L 19/12*  (2006.01)
  *G10L 19/00*  (2006.01)
(52) U.S. Cl. ......... 370/412; 370/503; 370/389; 709/220
(58) Field of Classification Search .................. 455/444; 370/200
See application file for complete search history.

(56) References Cited

U.S. PATENT DOCUMENTS
4,360,910 A * 11/1982 Segal et al. ................. 370/266
(Continued)

FOREIGN PATENT DOCUMENTS
JP    2002-268697    9/1992
(Continued)

OTHER PUBLICATIONS

ITU-T Recommendation G. 711 Appendix I, "A high quality low-complexity algorithm for packet loss concealment with G. 711" pp. 1-18, 1999.

(Continued)

*Primary Examiner* — Asad Nawaz
*Assistant Examiner* — Jason Harley
(74) *Attorney, Agent, or Firm* — Oblon, Spivak, McClelland, Maier & Neustadt, L.L.P.

(57) ABSTRACT

When acoustic signal packets are communicated over an IP communication network, data corresponding to an acoustic signal (acoustic signal corresponding data) has been included and transmitted in a packet different from a packet containing the acoustic signal. However, conventionally, a packet in which the acoustic signal corresponding data is to be included must be determined beforehand and cannot dynamically be changed.

According to the present invention, the amount of delay of acoustic signal corresponding data with respect to an acoustic signal is contained in an acoustic signal packet as delay amount control information. Furthermore, the conditions of a communication network are detected from the number of packets lost in a burst loss or jitters and the number of the packets to be stored and the amount of delay at the receiving end are thereby determined.

3 Claims, 32 Drawing Sheets

U.S. PATENT DOCUMENTS

| | | | | |
|---|---|---|---|---|
| 6,038,230 | A * | 3/2000 | Ofek | 370/389 |
| 2002/0006136 | A1* | 1/2002 | Mallory et al. | 370/466 |
| 2002/0041570 | A1* | 4/2002 | Ptasinski et al. | 370/252 |
| 2002/0057717 | A1* | 5/2002 | Mallory | 370/503 |
| 2002/0169859 | A1* | 11/2002 | Serizawa | 709/220 |
| 2003/0002450 | A1* | 1/2003 | Jalali et al. | 370/294 |
| 2003/0043856 | A1* | 3/2003 | Lakaniemi et al. | 370/503 |
| 2003/0235176 | A1* | 12/2003 | Zhang et al. | 370/338 |
| 2004/0083110 | A1* | 4/2004 | Wang | 704/500 |
| 2004/0128128 | A1* | 7/2004 | Wang et al. | 704/229 |
| 2005/0002409 | A1* | 1/2005 | Lai et al. | 370/412 |
| 2005/0206581 | A1* | 9/2005 | Kondo et al. | 345/1.2 |
| 2006/0049966 | A1 | 3/2006 | Ozawa et al. | |

FOREIGN PATENT DOCUMENTS

| | | |
|---|---|---|
| JP | 2004-120619 | 4/2002 |
| JP | 2002-515612 | 5/2002 |
| JP | 2003-050598 | 2/2003 |
| JP | 2003-316391 | 11/2003 |
| JP | 2003-318851 | 11/2003 |
| JP | 2004-080625 | 3/2004 |

OTHER PUBLICATIONS

Aoki, Naofumi, "A Packet loss concealment technique for VoIP using steganography based on pitch waveform replication", IEICE, vol. J86-B, No. 12, pp. 2551-2560, 2003. (with English translation).

Ohmuro, Hitoshi et al. "Improvement of speech quality under burst packet loss conditions using parallel transmission of speech feature parameters", Technical Report of IEICE.SP2004-77, pp. 35-40, 2004. (with English translation).

Wah, Benjamin W. et al., "A Survey of Error-Concealment Schemes for Real-Time Audio and Video Transmission over the Internet", Multimedia Software Engineering, 2000. Proceedings. International Symposium on, pp. 17-24, 2000.

Noriko Komaki, et al., "A Packet Loss Concealment Technique for VoIP Using Steganography", IEICE Trans. Fundamentals, vol. E86-A, No. 8, XP-001177867, Aug. 2003, pp. 2069-2072.

* cited by examiner

FIG. 19

| OBSERVED JITTER TIME | QUANTITY OF PACKETS TO BE STORED IN BUFFER (TARGETED VALUE OF NUMBER OF STORED PACKETS) |
|---|---|
| TO 15 ms | 1 FRAME |
| TO 32 ms | 2 FRAME |
| TO 48 ms | 3 FRAME |
| TO 64 ms | 4 FRAME |
| TO 80 ms | 5 FRAME |
| TO 96 ms | 6 FRAME |
| TO 128 ms | 8 FRAME |
| TO 160 ms | 10 FRAME |
| TO 192 ms | 12 FRAME |
| TO 240 ms | 15 FRAME |
| TO 320 ms | 20 FRAME |
| TO 400 ms | 25 FRAME |
| TO 480 ms | 30 FRAME |
| TO 640 ms | 40 FRAME |
| TO 800 ms | 50 FRAME |

ACOUSTIC SIGNAL PACKET COMMUNICATION METHOD, TRANSMISSION METHOD, RECEPTION METHOD, AND DEVICE AND PROGRAM THEREOF

TECHNICAL FIELD

The present invention relates to a communicating method, transmitting method, and receiving method that provide measures against packet loss during transmission of acoustic signals such as digitized voice and music over a packet communication network such as the Internet, and to an apparatus and program therefor.

BACKGROUND ART

Services using Voice over IP (Internet Protocol) technology to transmit voice signals is becoming widespread. As shown in FIG. 1, a voice signal from an input terminal 11 is converted in a voice signal transmitting unit 12 into voice packets, transmitted over a packet communication network 13 such as an IP network to a voice signal receiving unit 14, where the voice signal is reproduced and outputted to an output terminal 15. There exists a problem that when packets are communicated in real time, packet losses can occur on the packet communication network 13 depending on the conditions of the network, causing quality degradation such as audible discontinuity in reproduced speech. This problem is pronounced especially during network congestion in the so-called best-effort communication services such as the Internet, which tolerate packet losses.

Therefore, a technique called packet-loss concealment is used when voice signals are transmitted over a packet communication network. This approach uses a technique in which if a packet is lost somewhere on the communication channel or does not arrive at a receiving end within a time limit due to a delay on the communication channel, then the voice signal in the segment corresponding to the packet that has vanished or has not arrived (hereinafter referred to as a "loss packet" or "lost packet") is estimated and compensated at the receiving end. FIG. 2 shows an example of a typical configuration of the voice signal transmitting unit 12 shown in FIG. 1. An input voice signal is stored in an input buffer 21, then the voice signal is split into time segments, called frames, having a predetermined length to generate voice packets in a voice packet generating unit 22, and the voice packets are sent out from a packet transmitting unit 23 to a packet communication network. The time length of one frame is typically 10 to 20 milliseconds or so.

FIG. 3 shows an example of a typical configuration of the voice signal receiving unit 14 shown in FIG. 1. Voice packets received at a packet receiving unit 31 through a packet communication network are stored in a receiving buffer 32, also called a jitter absorbing buffer. For a frame whose packet has been successfully received, the voice packet is extracted from the receiving buffer and decoded into a voice signal in a voice packet decoding unit 33. For a frame whose packet is lost, packet-loss concealment processing is performed to generate a voice signal in a lost signal generating unit 34 and the generated voice signal is outputted. If pitch period (the length equivalent to the fundamental frequency of sound on the time axis) information is used for packet-loss concealment processing, the output voice signal is stored in an output voice buffer 35, then pitch analysis on the signal is performed in a pitch extracting unit 36 and the obtained value of the pitch period is provided to the lost signal generating unit 34. The signal generated in the lost signal generating unit 34 is outputted to the output terminal 15 through a selector switch 37. If there is no packet loss, the decoded signal from the voice packet decoding unit 33 is outputted to the output terminal 15 through the selector switch 37. It should be noted that communication terminals that perform bidirectional voice communication have both transmitter and receiver. A well-known typical packet-loss concealment technique is the one described in Non-patent literature 1. The technique in Non-patent literature 1 uses the pitch period of sound for packet-loss concealment.

FIG. 4 shows a typical packet-loss concealment technique which is also used in Non-patent literature 1. FIG. 4 shows processing performed when a packet corresponding to frame n, the current frame at the receiving end has been lost. It is assumed here that the previous frames (until frame n−1) of the voice signal have been properly decoded or the voice signal for a lost packet has been generated through the use of packet-loss concealment. A voice signal waveform of the segment 3A equivalent to 1-pitch period is cut out from the last sample point of the previous frame n−1 and the 1-pitch period waveform cut out is repeated to fill the segments of frame n (segments 3B-3D).

By repeating the previous 1-pitch waveform to generate the waveform of a packet-loss frame in this way, speech can be reproduced with a natural speech quality, compared with padding all sample points in the frame n with zero values without applying any processing.

When a 1-pitch waveform is simply repeated, scratchy noise can be generated at connection points because of discontinuities of the waveforms at connection points. In such discontinuities at connection points can be prevented by using a technique shown in FIG. 5. For clarity, the segments of frame n are shown as staggered tiers of cut-out waveforms in FIG. 5. First, a waveform of segment 4A which has a length slightly longer than 1 pitch period, for example 5L/4 (5×L/4), from the last sample point of frame n−1 is cut out, where L is the pitch length. The cut out waveform is placed positions 4B, 4C, and 4D shifted by one pitch length. Because the cut out wavelength is longer than one pitch length, overlapping segments 4AB, 4BC, and 4CD result. These overlapping segments are superposed by applying a triangle window function shown in FIG. 6, for example. In FIG. 6, the horizontal axis represents time, the vertical axis represents weight, t1 indicates the starting point of an overlapping segment, and t2 indicates the end point of the overlapping segment. For example, in the case of overlapping segment 4BC in FIG. 5, the cut out waveforms in segments B and C can be smoothly interconnected by multiplying the waveform of the portion of segment 4B in overlapping segment 4BC by a weighting function W1, and multiplying the waveform of the portion of segment 4C in overlapping segment 4BC by a weighting function W2, and then by adding the products together. The details of such superposition are also described in Non-patent literature 1.

It is said that the quality of sound generated by using the technique described in Non-patent literature 1 in a communication environment in which packet losses occur is generally good. However, if a packet loss occurs near the boundary between a consonant and a vowel in speech, uncomfortable noise can be generated (a first issue). Furthermore, if the packet of consecutive multiple frames are lost (referred to as a burst loss), that is, if packets of two or more consecutive frames, each having the length of 20 milliseconds, are lost, or if the packet of one frame in a voice encoding format with a long frame length is lost, that is, if the packet of a voice encoding format with a frame length of 40 or 60 milliseconds is lost, noisy buzz sound or unnatural sound is generated (a second issue).

The first issue results from creation of a waveform having the same characteristics as those of the voice waveform of the immediately preceding frame to generate sound of a loss frame in the method described in Non-patent literature 1. That is, if a frame nearer to the vowel around a boundary between a consonant and a following vowel is lost, a sound waveform having the same characteristics as the consonant is generated although the fact is that the lost frame is the period of the vowel. Similar noise can be generated at the time when sound changes from a vowel to silence or a consonant.

The second issue can arise even when a packet loss occurs in a segment that is not near the boundary between a consonant and a vowel. This is caused by the fact that the sound in the packet loss frame is reused (self-recursively) to generate a sound waveform having the same characteristics in the adjacent, subsequent frame loss segment and therefore the sound waveform with the same characteristics is reproduced consecutively over a period of time as long as 40 to 60 milliseconds or more. The pitch period and power of actual voice slightly changes and, when sound with the same characteristics is reproduced consecutively, the sound is perceived as sound differently from voice.

To solve the first and second issues, the technique described in Non-patent literature 2 has been proposed. In the technique in the literature, side information for the k-th frame is embedded in the k+1-th frame beforehand. If the k-th frame has not arrived due to a packet loss, then the side information embedded in the k+1-th frame is used to conceal the error in the k-th frame.

Non-patent literature 1: ITU-T Recommendation G.711 Appendix I, "A high quality low-complexity algorithm for packet loss concealment with G.711", pp. 1-18, 1999.

Non-patent literature 2: Naofumi Aoki, "A packet loss concealment technique for VoIP using steganography based on pitch waveform replication", IEICE Vol. J86-B, No. 12, pp. 2551-2560, 2003.

DISCLOSURE OF THE INVENTION

Issues to be Solved by the Invention

The use of the packet-loss concealment technique described in Non-patent literature 1 in a communication environment where packet loss occurs has the effect of reducing degradation of quality of reproduced sound to some extent. However, if a packet loss occurs near the boundary between a consonant and a vowel, uncomfortable noise cannot sufficiently be eliminated. Furthermore, if the packets of consecutive multiple frames are lost, unnatural perceived reproduction sound quality will result.

Non-patent literature 2 describes the technique which adds side information to conceal errors. However, the literature does not show how many frames (the amount of delay) after the acoustic signal frame its side information should be transmitted simultaneously with an acoustic signal frame. Communication conditions in a real communication network changes and accordingly jitter of packets and the frequency of packet losses change. Therefore, the optimum amount of delay should also change. However, none of the conventional-art techniques show a method for dynamically changing the amount of delay. Furthermore, the amount of delay must be determined beforehand between the end devices.

An object of the present invention is to provide a method that is capable of solving these issues and enables acoustic communications with more stable quality, and to provide an apparatus and program therefor.

Means to Solve Issues

According to the present invention, data corresponding to an acoustic signal in a frame with a frame number that differs from a packet of an acoustic signal by a value specified by delay amount control information (hereinafter referred to as "acoustic signal corresponding data") and the delay amount control information are contained in the same packet of the acoustic signal at the sending end and transmitted. At the receiving end, if a packet cannot be received, the acoustic signal corresponding data with the same frame number as the lost frame of the acoustic signal (hereinafter referred to as a "lost frame") is obtained from a packet in a receiving buffer by using the delay amount control information. Then, the obtained acoustic signal corresponding data is used to generate an acoustic signal for the lost frame at the receiving end.

According to the present invention, the amount of delay is changed in accordance with the conditions of a communication network. Specifically, the maximum value of the length of packet jitter time or the maximum value of the number of consecutive packet-loss frames in a predetermined period (for example, if the packet of a single frame is lost, the number is 1; if the packets of consecutive three frames are lost, the number is 3) (hereinafter referred to as "the number of consecutive packet losses") is detected. The number of packets stored in the receiving buffer (hereinafter referred to as "the number of stored packets") and the amount of delay are controlled so that the following condition is met:

the number of frames equivalent to the amount of jitter time (fractions rounded up to an integer)$\leq$the amount of delay$\leq$the number of stored packets or the number of consecutive packet losses$\leq$the amount of delay$\leq$the number of stored packets According to the present invention, at the sending end, at least the pitch period corresponding to an acoustic signal in each frame is obtained as an acoustic feature, and the acoustic signal and the acoustic feature which have frame numbers that differ from each other by the number of frames specified as delay amount control information are contained in the same packet and transmitted. At the receiving end, if a packet corresponding to the acoustic signal in a frame to be outputted is lost, the acoustic feature corresponding to the acoustic signal of the lost packet is obtained from a packet in the receiving buffer, a waveform having the length equivalent to the pitch period contained in the obtained acoustic feature is cut out from the acoustic signal in the frame closest to the acoustic signal frame of the lost packet (hereinafter referred to as the "lost frame"), the cut out waveform is repeated at the pitch periods, and the signal repeated is used to generate an acoustic signal for the lost packet.

Effects of the Invention

According to the present invention, the delay amount control information is contained in a packet and sent and acoustic signal corresponding data of each frame is sent in another packet. That is, even if the amount of delay is changed at the sending end, the relation between the acoustic signal and the acoustic signal corresponding data can be known at the receiving end. Therefore, if the acoustic signal of a frame is lost due to a packet loss, the packet of the data corresponding to the acoustic signal can be received without a packet loss and can be readily obtained from the transmitted delay amount control information.

Furthermore, if the pitch period of the acoustic signal is used as the acoustic signal corresponding data, an acoustic signal waveform having the length equivalent to the pitch period is cut out and arranged to generate a lost acoustic signal. Therefore, even if random 1-pitch losses occur, or multiple frame packet losses occur, the acoustic signal is reproduced nearly with the sound quality that would be achieved in the case where no packet losses occur, and accordingly stable acoustic communication can be achieved.

In this way, real-time stable acoustic communication can be performed over a packet communication network on which the frequency of packet losses is high. Packet communication networks are typically designed in such a manner that they tolerate a certain degree of packet losses to reduce cost. The present invention also has the effect of reducing network costs because the use of the present invention can eliminate the need for designing high-quality transmission circuits with low packet loss rates.

Furthermore, the amount of delay is controlled in accordance with the conditions of the communication networks to decrease the number of packet stored in the receiving buffer to reduce the delay time between the reception of a voice packet and actual reproduction of the voice signal if the conditions of the network are relatively good. If the conditions of the network is relatively bad, the number of packets stored in the receiving buffer is increased so that acoustic signal corresponding data can be obtained with reliability to reproduce a voice signal with minimized degradation in quality (although the delay time between the reception of a voice packet and actual reproduction of the voice signal is increased) even on the occurrence of a burst packet loss.

BRIEF DESCRIPTION OF THE DRAWINGS

FIG. 19 shows an example of the relation between jitter time and the number of stored packets;

BEST MODES FOR CARRYING OUT THE INVENTION

Figure 1:
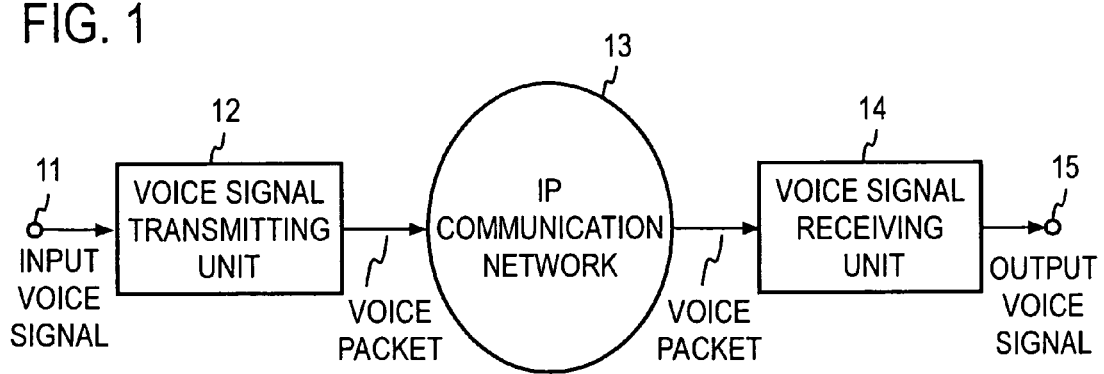
FIG. 1 is a conceptual diagram showing a case in which a voice signal is converted into voice packets and the voice packets are communicated over a packet communication network.
Figure 2:
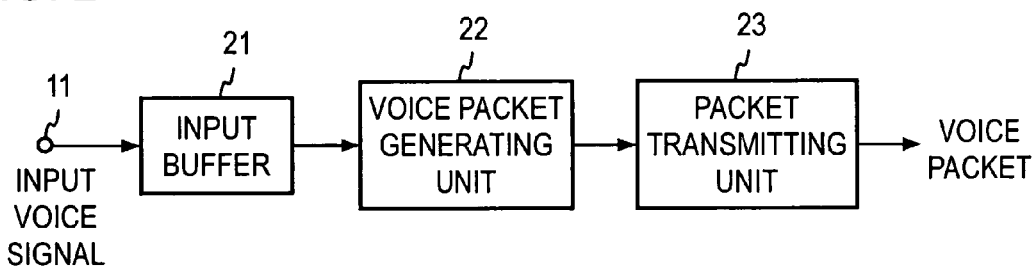
FIG. 2 is a block diagram showing an example of a typical functional configuration of a voice signal transmitting unit 12 shown in FIG. 1.
Figure 3:
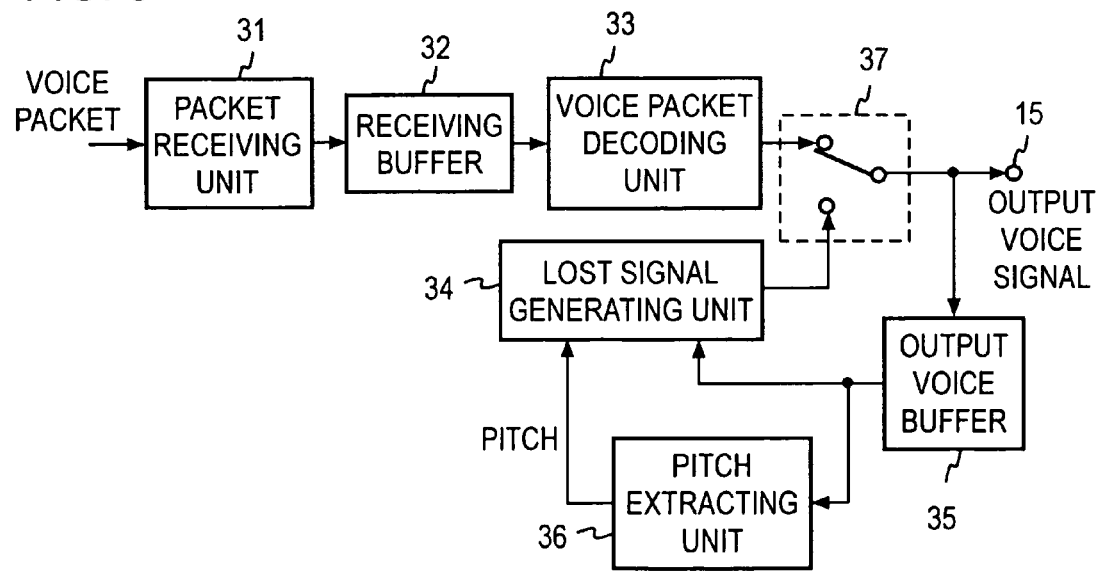
FIG. 3 is a block diagram showing an example of a typical functional configuration of a voice signal receiving unit 14 shown in FIG. 1.
Figure 4:
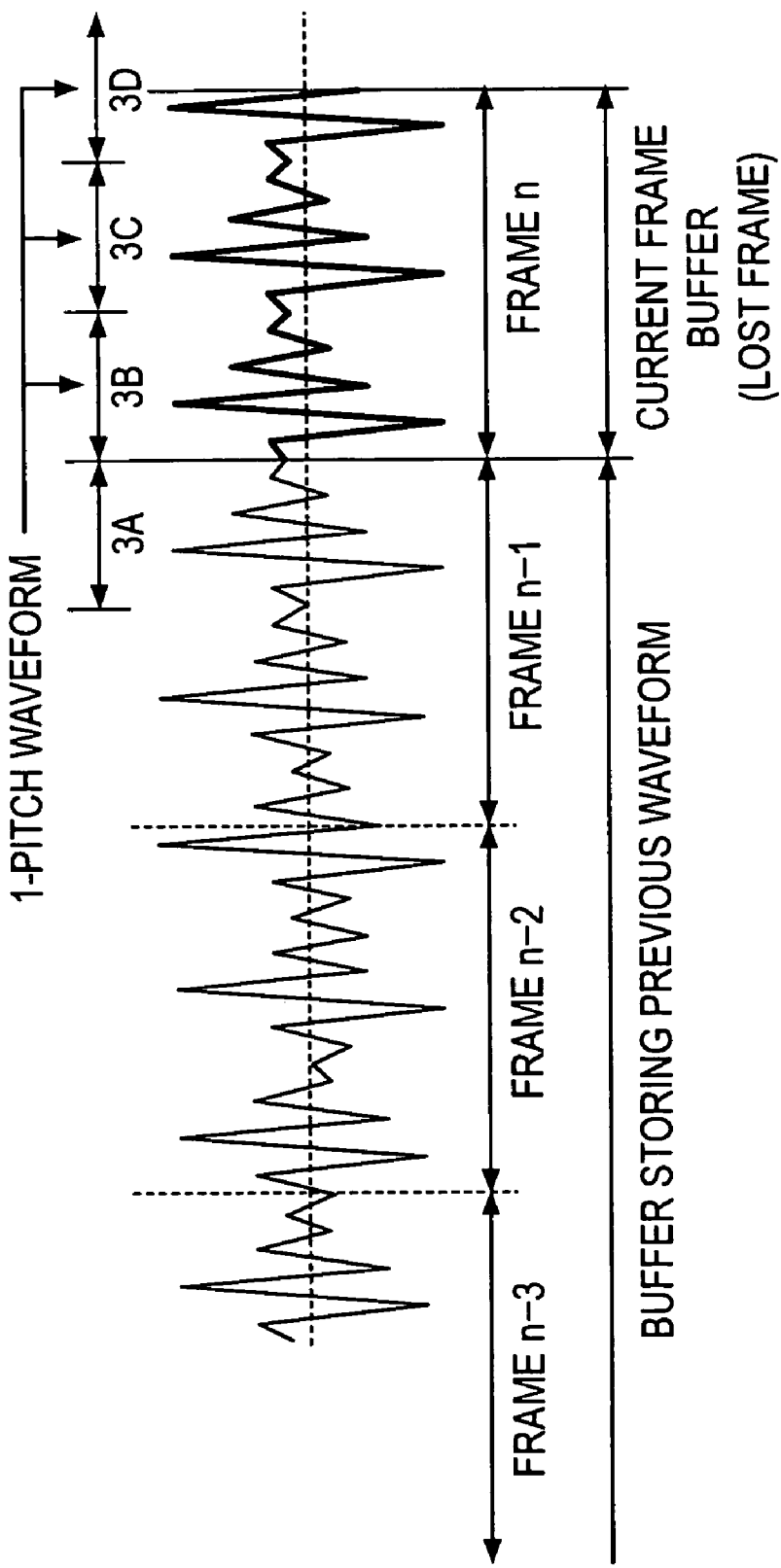
FIG. 4 is a waveform chart for illustrating generation of a lost signal by using a typical packet loss concealment technique.

The present invention can be carried out by a computer and a computer program or carried out by implementing it on a digital signal processor or a dedicated LSI. While the present invention can be applied to acoustic signals such as voice or music signals, cases in which the present invention is applied to a voice communication system using Voice over IP shown in FIG. 1 will be described below. In order to avoid repetition of description, components having the same function or steps of performing the same processing are labeled the same reference numerals.

In the description of a first embodiment, a functional configuration of a voice signal transmitting apparatus and a voice signal receiving apparatus and a process flow will be described with respect to a case where a pitch period is used as acoustic signal corresponding data. In the description of a second embodiment, a method for dynamically changing the amount of delay and the number of stored packets in conjunction with the conditions of a communication network will be described. Acoustic signal corresponding data used in the second embodiment is not limited to a pitch period. It may be an acoustic signal itself or other acoustic signal feature parameter.

First Embodiment

Figure 7:
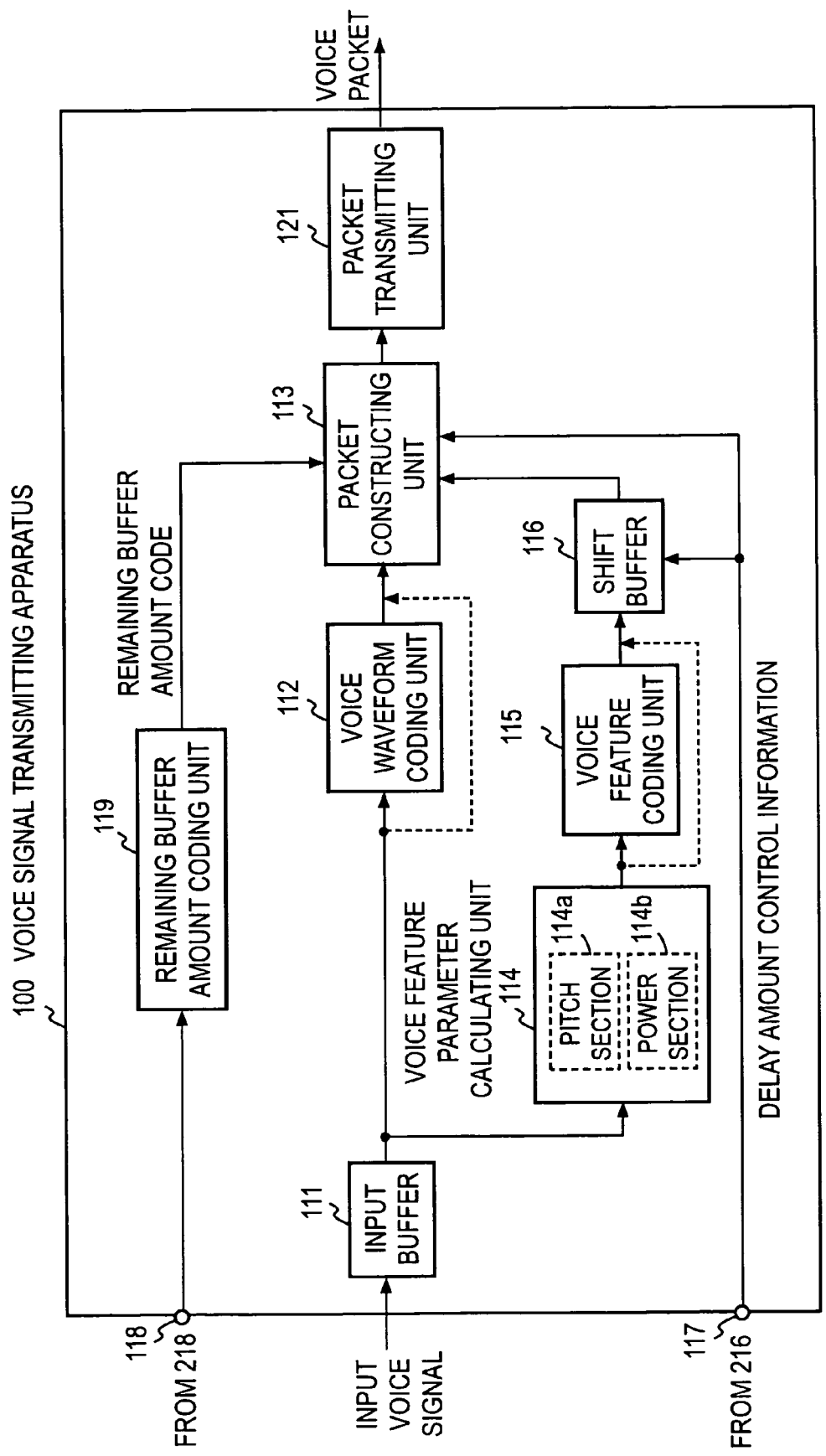
FIG. 7 shows an exemplary functional configuration of a voice signal transmitting apparatus 100 according to the present invention.
Figure 8:
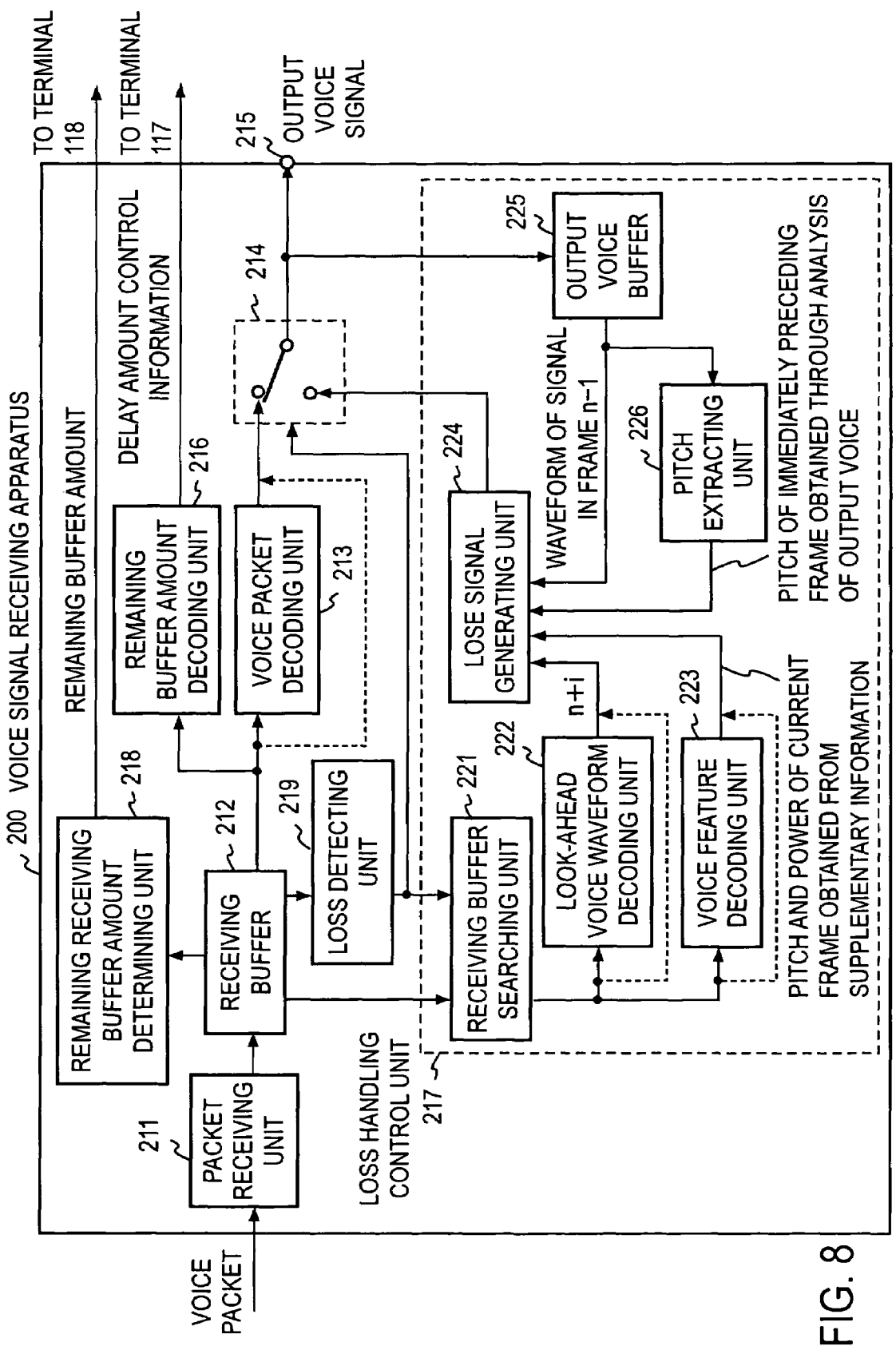
FIG. 8 shows an exemplary functional configuration of a voice signal receiving apparatus 200 according to the present invention.
Figure 9:
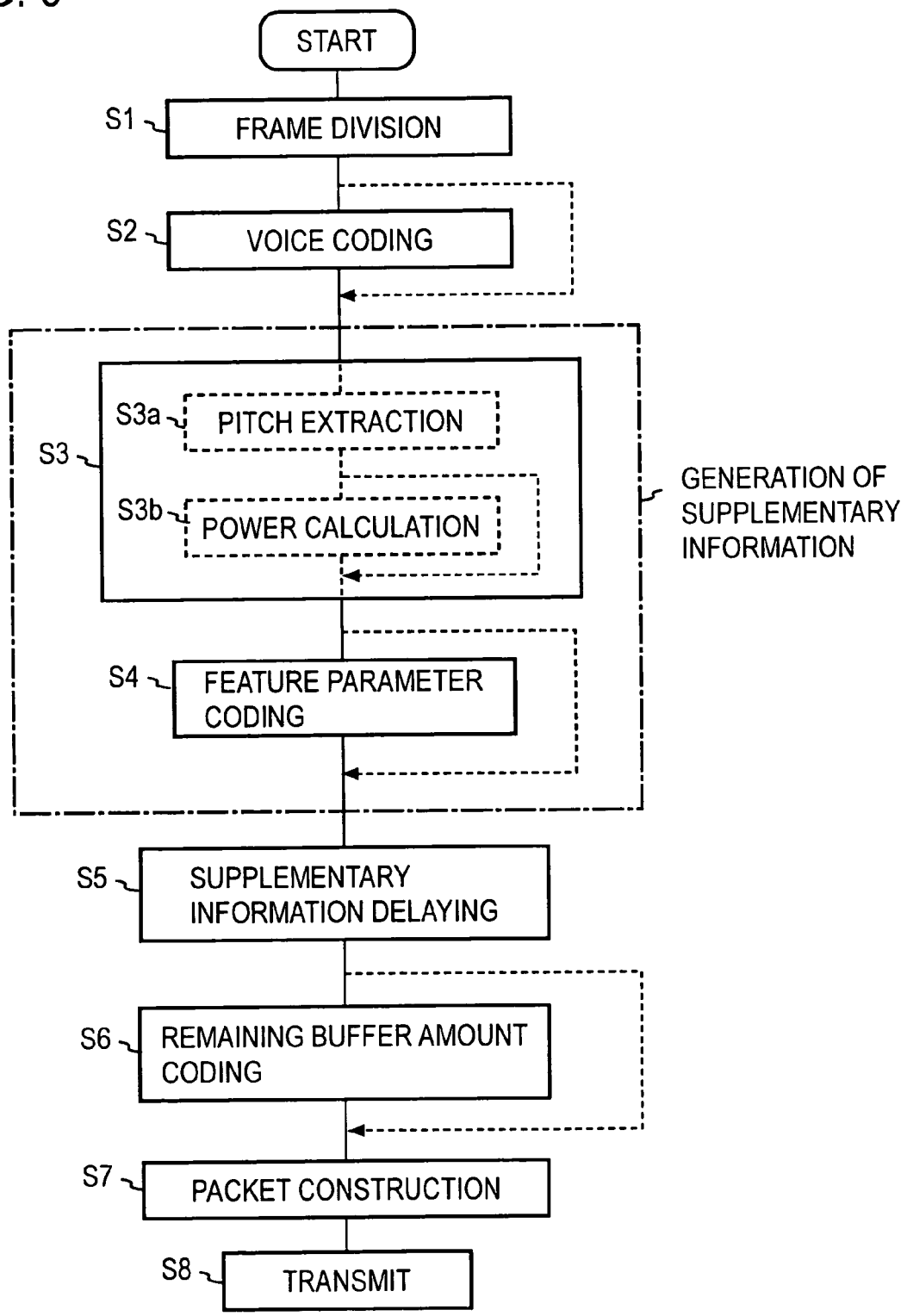
FIG. 9 shows a process of an acoustic signal packet transmitting method according to the present invention.
Figure 10:
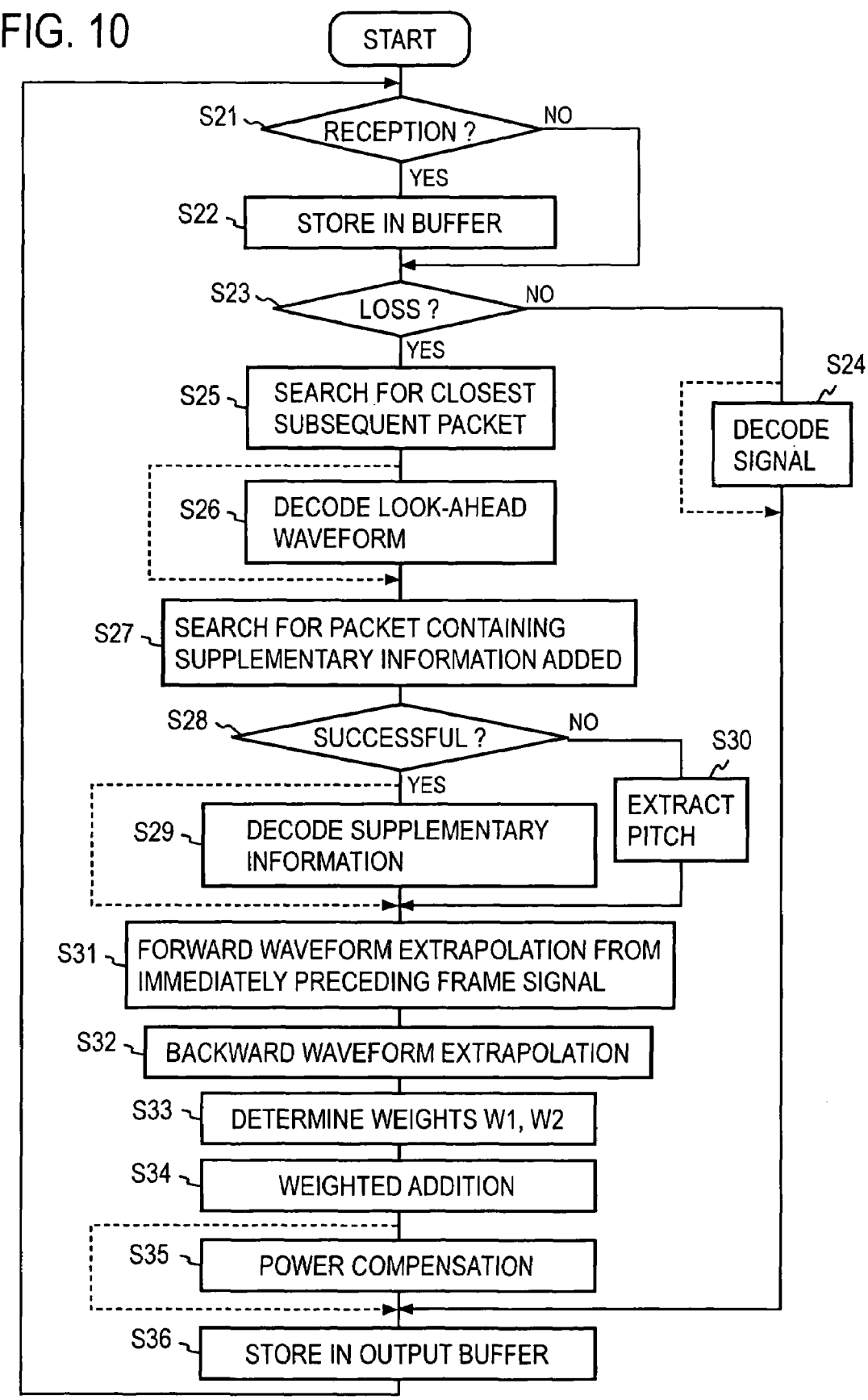
FIG. 10 shows a process of an acoustic signal packet receiving method according to the present invention.

FIG. 7 shows an exemplary functional configuration of a voice signal transmitting apparatus 100 (which corresponds to the transmitting unit 12 shown in FIG. 1); FIG. 8 shows an exemplary functional configuration of a voice signal receiving apparatus 200 (which corresponds to the receiving unit 14 shown in FIG. 1); FIG. 9 shows an example of a process performed in the voice signal transmitting apparatus 100; FIG. 10 shows a process performed in the voice signal receiving apparatus 200.

Sending End

In the transmitting apparatus 100, an input voice signal is stored in an input buffer 111, divided into given time segments called frames, that is, divided into frames (step S1), and then sent to a voice waveform coding unit 112. The time length of one frame is typically 10 to 20 milliseconds or so.

The voice waveform coding unit 112 uses for example G.711 (μ-law PCM or A-law PCM), which is an ITU-T standard coding algorithm, to convert the input voice signal into a voice code (step 2). It should be noted that non-G.711 algorithms or other non-standard voice coding algorithms may also be used. The voice code is sent to a packet constructing unit 113.

A voice feature parameter calculating unit 114 uses the voice signal stored in the input buffer 111 to calculate voice features of the voice signal in the current frame (step S3). The term "voice feature parameter" refers to a value such as a pitch period (equivalent to the fundamental frequency of voice) and power. Any or all of the features may be used. A pitch period can be obtained in a pitch section 114a by calculating the autocorrelation coefficient of a voice signal waveform or of a signal obtained by, for example, applying a filter having the inverse characteristic of a spectral envelope to a voice signal waveform (step S3a). Power is obtained in a power section 114b by calculating the sum of squares of all samples of the voice signal in a frame (step S3b). The feature parameter representing power may be a value obtained by dividing the sum of squares by the number of samples in one frame length (160 samples if the sampling frequency of the voice signal is 8 kHz and the frame length is 20 milliseconds) and calculating the square root of the quotient (the square root of power per sample).

In a voice feature coding unit 115, the voice feature parameter is quantized so that it can be represented by the number of bits (or bytes), then the quantized value is converted into a code (step S4). For example, if a pitch period is used and voice is sampled with a sampling frequency of 8 kHz, and pitch period searching range is 40 to 120 samples, then integers from 0 to 80 can be assigned as codes and a pitch period can be coded by using 7 bits. If the searching range is 20 to 160 samples, integers from 0 to 140 can be assigned as codes and a pitch period can be coded by using 8 bits. Power can be coded with 8 bits by applying G.711 to the square root of the power per sample (in practice, power may be coded with 7 bits because power does not take a negative value and therefore a sign bit can be omitted).

The coded voice features are sent to a shift buffer 116. In the shift buffer 116, the codes of voice features are retained over a predetermined number of frames. When delay amount control information, which will be described later, is inputted into the shift buffer 116 through a terminal 117, the shift buffer 116 sends the codes of voice features (also referred to as "supplementary information") of the voice signal as many frames preceding the current frame as the number of frames specified by the delay amount control information, namely past frames, to a packet constructing unit 113. For example, if the delay amount control information is 3, then the voice feature codes generated in frame n−3, where n represents the current frame, is delayed in the shift buffer 116 by 3 frames and then sent to the packet constructing unit 113 (step S5).

The remaining buffer amount, which will be described later, is inputted through a terminal 118 and coded in a remaining buffer amount coding unit 119 (step S6). The remaining buffer amount code is also sent to the packet constructing unit 113. In the packet constructing unit 113, a packet is constructed by using the aforementioned code resulting from the coding of the voice signal waveform, the codes of the voice features, the delay amount control information, and the remaining buffer amount code (step S7). It should be noted that in certain cases, the delay amount control information and the remaining buffer amount code are not included in a packet, which cases will be described later.

A packet transmitting unit 121 receives the information of the packet constructed in the packet constructing unit 113 and sends out it as a voice packet to the packet communication network (step S8).

Figure 11:
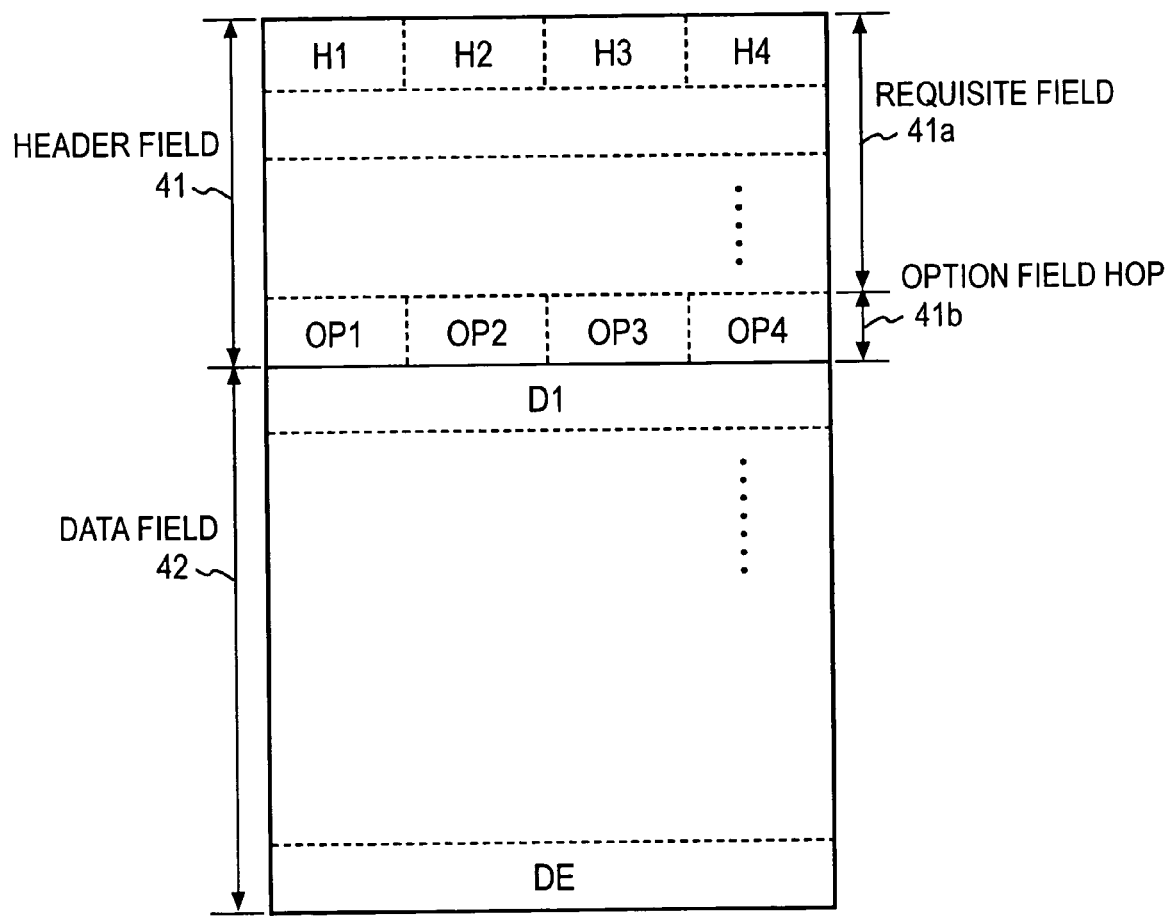
FIG. 11 shows an exemplary structure of a packet.

FIG. 11 shows an exemplary structure of a packet constructed in the packet constructing unit 113. A packet typically consists of a header field 41 and a data field 42. The header field 41 includes a requisite field 41a and an option field 41b. The destination and timestamp such as the frame number of the packets are contained in the header field 41. Code data which is generated by coding a voice signal waveform is contained in the data field 42. The codes of voice features may be contained in the option field HOP 41b of the header field 41 or in the starting position D1 or the end position DE of the data field 42 because these codes are smaller in size (the number of bytes) than waveform data. Containing these codes in the option field HOP has the advantage that the compatibility between the present invention and a method that does not use the present invention can be more easily retained. The length of the header field 41 of a packet is typically a multiple of 4 bytes. If each of the pitch period and power is quantized into 1 byte of voice feature parameter and sent (if it consists of 7 bits, it is rounded up to 1 byte=8 bits), 2 bytes of the pitch period and power information in total and the delay amount control information and the remaining buffer amount code, each represented by 1 byte, total to 4 bytes. Each of the 4 bytes is contained in four locations OP1, OP2, OP3, and OP4 in the option field HOP 41b, for example. The purpose of transmitting the delay amount control information along with the supplementary information (voice feature codes) is to letting the receiving end know which frame the supplementary information is associated with. Therefore, the delay amount control information can be considered a timestamp relative to frame n. The purpose of transmitting the remaining buffer amount code along with the supplementary information is to indicate to the receiving end the number of frames by which transmission of supplementary information should be delayed with respect to frame n when that receiving end transmits a packet to the sending end.

If the number of frames by which supplementary information is delayed with respect to frame n is not to be changed dynamically from frame to frame, then the delay amount control information and remaining buffer amount code do not need to be transmitted along with supplementary information and therefore the remaining buffer amount coding unit 119 in FIG. 7, the remaining buffer amount decoding unit 216, the remaining receiving buffer amount determining unit 218 in FIG. 8, and step S6 in FIG. 9 are omitted. This is because the sending and receiving ends only need to know a predetermined relative frame delay beforehand (through negotiation during establishing a call connection, for example). In that case, delay amount control information and remaining buffer amount code, each being 1-byte long, do not need to be sent and only pitch period and power information, a total of 2-bytes, need to be sent. Because the length of the header field is a multiple of 4 bytes, supplementary information for two frames, for example supplementary information for the voice signal of frames n−3 and n−6 can be transmitted along with the packet of frame n. Consequently, the probability that both of a voice signal code and its supplementary information are lost by packet loss decreases. If delay amount control information is to be set to a constant value, then it should be the number of frames equivalent to a length of about 60, 80, or 100 milliseconds so that both voice signal codes and their supplementary information are not lost, that is, so that they are less susceptible to burst loss and yet their real-time communication is not spoiled.

Receiving End

In a voice signal receiving apparatus 200 in FIG. 8, a packet receiving unit 211 receives a voice packet from the packet communication network (step S21) and stores it in a receiving buffer 212 (step S22). The receiving buffer 212 is also called a jitter absorbing buffer. As described earlier, a voice packet contains a code generated by coding a voice signal waveform, supplementary information such as pitch and power codes, delay amount control information, and remaining buffer amount information. If the number of frames by which supplementary information is delayed with respect to frame n is not to be dynamically changed from frame to frame, the delay amount control information and remaining buffer amount code are not required. However, it is assumed in the following description that a packet contains both delay amount control information and remaining buffer amount code.

The code resulting from coding of a voice signal waveform contained in the voice packet received is sent to a voice packet decoding unit 213, where it is decoded (step S24). In a frame the packet of which has not been lost, the output signal from the voice packet decoding unit 213 is provided to an output terminal 215 as reproduced voice through a selector switch 214 (step S36).

A remaining buffer amount decoding unit 216 obtains, from the remaining buffer amount code contained in the received voice packet, delay amount control information which specifies the number of frames by which the supplementary information should be delayed. The obtained delay amount control information is sent to the terminal 117 in FIG. 7, that is, to the shift buffer 116 and the packet constructing unit 113. The relation between the remaining buffer amount at the sending end and delay amount control information will be described later.

The delay amount control information contained in the received voice packet is used in a loss handling control unit 217. The processing performed in the loss handling control unit 217 will be detailed later.

A remaining receiving buffer amount determining unit 218 detects the number of frames of packets stored in the receiving buffer 212. For example, if packets of a voice signal code in frames n+1, n+2 and n+3 are stored in the receiving buffer 212 while frame n is being decoded by the voice packet decoding unit 213, the remaining buffer amount, namely the number of frames of stored packets is 3. The remaining buffer amount information is sent to the terminal 118 in FIG. 7, namely, the remaining buffer amount coding unit 119. This communicating method in which the transmitting apparatus 100 shown in FIG. 7 and the receiving apparatus 200 shown in FIG. 8 cooperate assumes that bidirectional voice communication is performed and each of the terminal devices has both of the transmitting apparatus 100 and receiving apparatus 200.

The terminal 117 of the voice signal transmitting apparatus 100 is an input terminal for inputting a signal for controlling the transmitting apparatus 100 itself. That is, voice features are included in a packet delayed in accordance with delay amount control information inputted to the input terminal 117. The terminal 118, on the other hand, is an input terminal for information to be transmitted to the voice signal receiving apparatus 200 at the other end of the communication. This information does not control the voice signal transmitting apparatus 100. In other words, the information inputted to the terminal 118 is just transmitted to the other end of the communication.

A loss detecting unit 219 detects a packet loss (step S23). Packets received at the packet receiving unit 211 are stored in the receiving buffer 212 in the order of their packet numbers, namely the order of their frame numbers. For example, if the frame number of a received packet is greater than that of the packet received immediately before that packet by 3, then that packet is stored in the packet storage location of three next from the storage location of the packet received immediately before that packet. Packets are read from the receiving buffer 212 in the order of storage locations. If no packet is found in a storage location from which a packet is to be read during reading operation, the packet loss detecting unit 219 determines that a packet loss has occurred and turns the selector switch 214 to the output of the loss handling control unit 217. Details of packet-loss concealment control processing performed at the loss handling control unit 217 will be described below.

If the packet of frame n is lost, then a receiving buffer searching unit 221 searches through the received packets stored in the receiving buffer 212 to find the packet chronologically closest to the lost frame n (the packet whose timestamp is closest to that of the lost frame n) among the received packets in frame n+1 and the subsequent frames (step S25). Assuming that the packet of frame n+i is found as a result of the search, where i=1 if frame n+1 has not been lost, i=3 if consecutive frames n+1 and n+2 have been lost and frame n+3 has not been lost, and so on, then the code resulting from coding of a voice signal waveform contained in the packet of frame n+i is decoded in a look-ahead voice waveform decoding unit 222 (step S26) to obtain the voice signal waveform of frame n+i. Then, the receiving buffer searching unit 221 searches through the packets stored in the receiving buffer 212 for a packet to which supplementary information corresponding to the voice signal of the lost frame n is added (step S27).

As described earlier, if delay amount control information (relative timestamp) is added to a packet, a packet to which supplementary information corresponding to the voice signal of frame n is added can be found on the basis of the delay amount control information. For example, if 3 is added to the packet of frame n+3 as delay amount control information, then it is the packet which contains the supplementary information corresponding to the voice signal of frame n. If the number of frames by which a packet having supplementary information added is delayed is not dynamically changed from frame to frame, then delay amount control information need not to be added to a packet at the sending end. In that case, a packet to which supplementary information corresponding to the voice signal of lost frame n added is searched for on the basis of a predetermined amount of delay. For example, if the predetermined amount of delay is 5, then the packet of frame n+5 has the supplementary information corresponding to the voice signal of lost frame n added. If supplementary information for two frames is added to the packet of one frame as descried earlier, then two packets having supplementary information corresponding to the voice signal of lost frame n can be found as a result of search in the receiving buffer 212. In such a case, any of them may be used.

If such a packet is found through this search (step S28), then the found supplementary information corresponding to the voice signal of lost frame n is decoded into the pitch and power information of the voice signal of lost frame n in a voice feature decoding unit 223 (step S29) and sent to a lost signal generating unit 224.

On the other hand, the output voice signal to be outputted to the output terminal 215 is stored in an output voice buffer 225 (step S36) as in the method described in Non-patent literature 1. If a packet is not found at step S28 through the search, then the pitch period of the output voice signal in the output voice buffer 225 is analyzed in a pitch extracting unit 226 (step S30). The pitch extracted in the pitch extracting unit 226 corresponds to the pitch of the voice signal of frame n−1 immediately preceding the lost frame. The pitch corresponding to the voice signal of the immediately preceding frame n−1 is sent to the lost signal generating unit 224.

Figure 12:
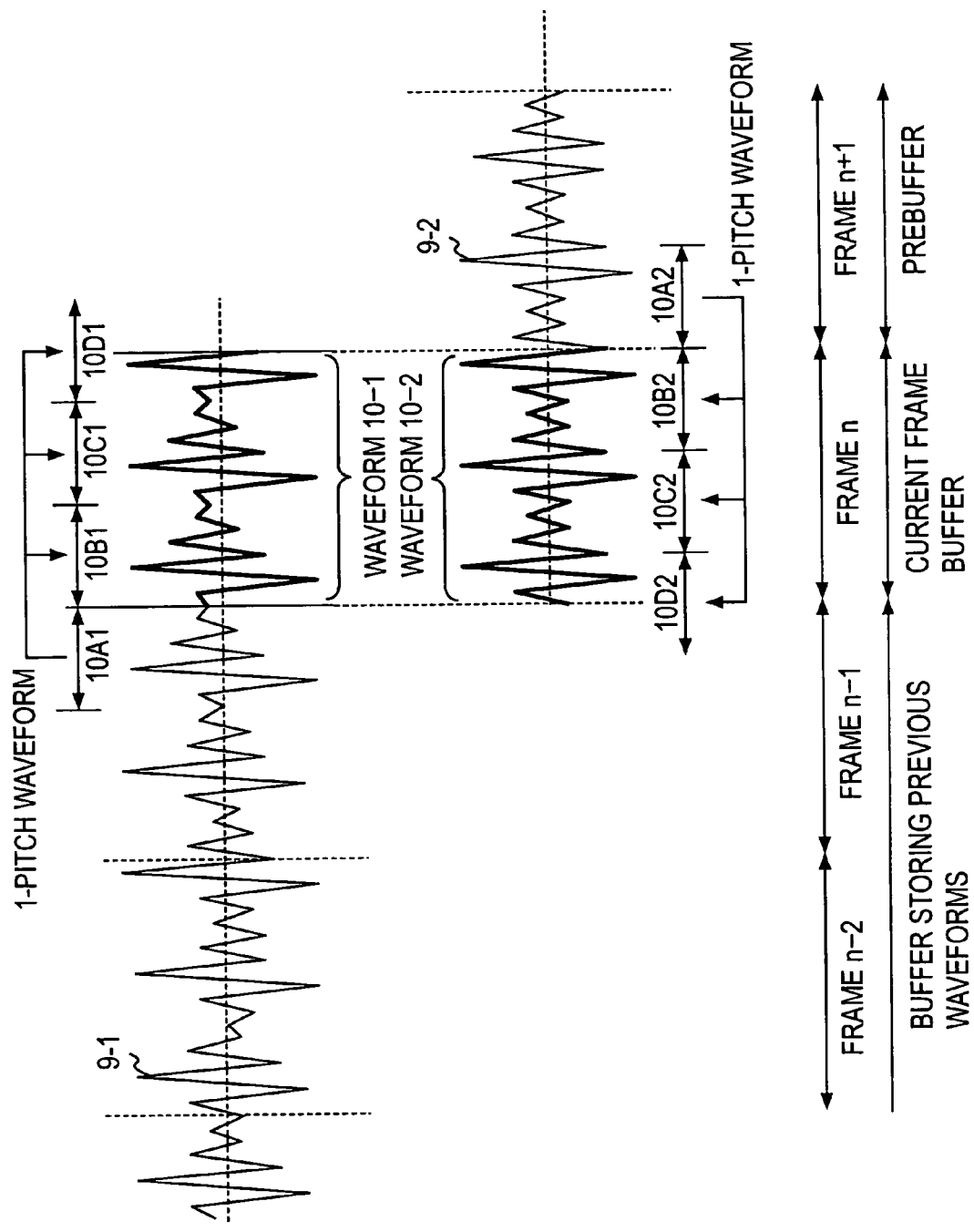
FIG. 12 is a waveform chart for illustrating an example of operation of a lost signal generating unit 224 shown in FIG. 8.
Figure 13:
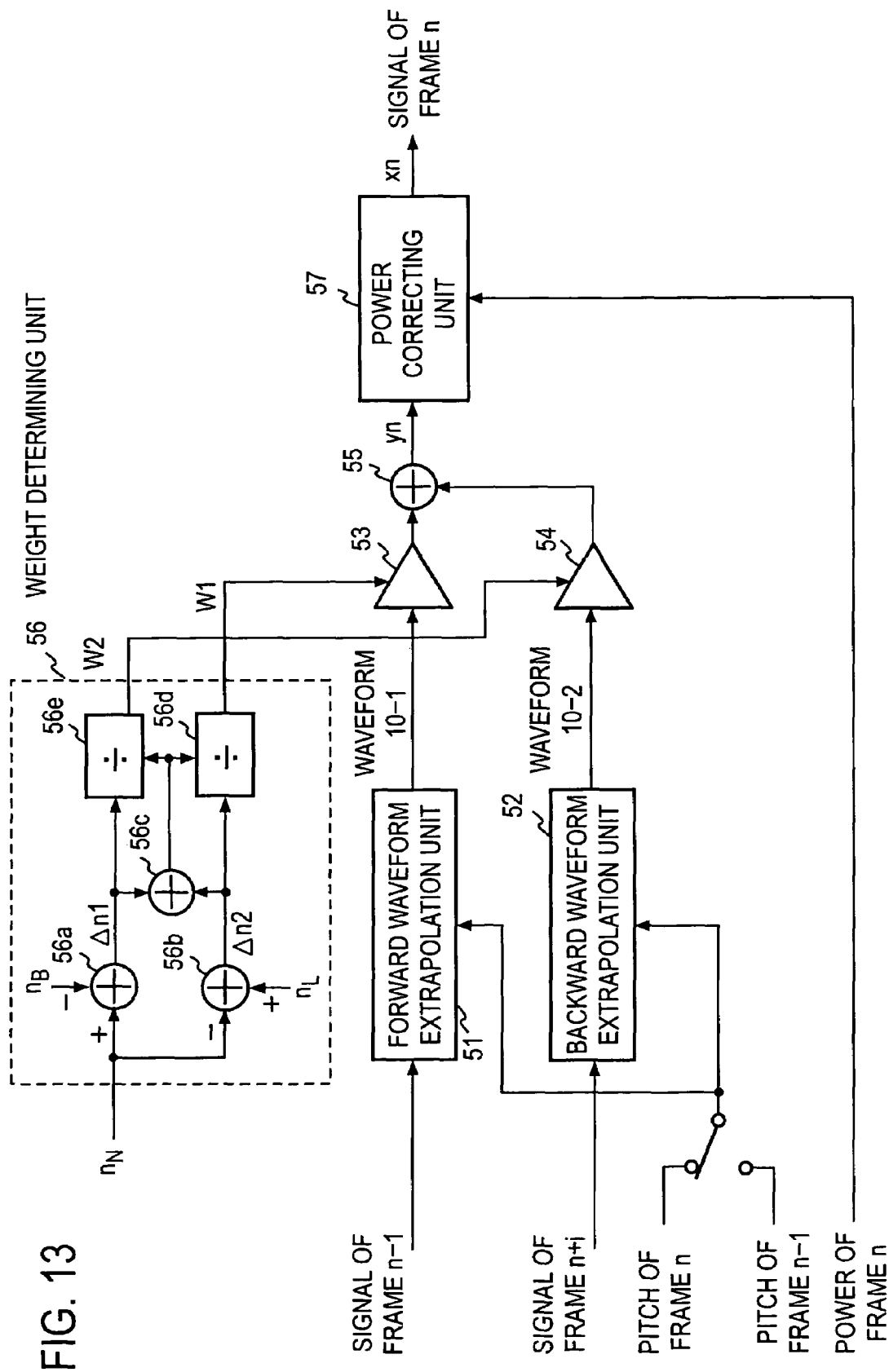
FIG. 13 shows a specific example of a functional configuration of the lost signal generating unit 224 shown in FIG. 8.

FIG. 12 shows a conceptual diagram of operation of the lost signal generating unit 224 and FIG. 13 shows an exemplary functional configuration of the lost signal generating unit 224. It is assumed that the packet corresponding to frame n has been lost, where frame n is the current frame. The method described in Non-patent literature 1 repeats a waveform of frame n−1 immediately preceding a packet-loss frame on a pitch-by-pitch basis. In that method, the characteristics, including the pitch period and power, of the signal are the same as those of the immediately preceding frame n−1. In this embodiment, a signal waveform corresponding to the pitch period is cut out from the signal of the immediately preceding frame n−1 and the signal waveform is repeated on a pitch period basis to generate one frame length of waveform 10-1 in a forward waveform extrapolation unit 51 as shown in FIG. 13 (step S31). Whereas the method described in Non-patent document 1 uses the pitch length of the voice signal in the immediately preceding frame n−1 as the pitch period, the present invention uses the pitch length of the voice signal of the lost frame n obtained by decoding supplementary information. If the packet including the supplementary information cannot be found at step S28 and the supplementary information also cannot be obtained as in the case where the packet has been also lost, the pitch length of the voice signal in the immediately preceding frame n−1 obtained at step 30 is used.

Also in the present embodiment, a signal waveform corresponding to the pitch period is cut out from the voice signal in a frame n+i that has been successfully received in the receiving buffer 212 after frame n+1 (that is, the signal in frame n+1 if the packet of frame n+1 has been successfully received, or the signal in frame n+2 if the packet of frame n+1 has also been lost and the packet of frame n+2 has been successfully received) and the waveform of the pitch period is repeated to generate one frame length of waveform 10-2 in a backward waveform extrapolation unit 52 (step S32). It should be noted that the waveform is repeated in the negative direction on the time axis because a future waveform on the time axis is used in the extrapolation. The pitch period used in the backward waveform extrapolation unit 52 is the pitch length of the voice signal in the lost frame n obtained by decoding supplementary information, as in the forward waveform extrapolation unit 51. However, if supplementary information cannot be obtained as in the case where the packet including the supplementary information has also been lost, the pitch length of the voice signal in frame n−1 may be used or, if supplementary information for the voice signal in frame n+1 has been successfully obtained, the pitch length of the voice signal in frame n+1 may be used.

Figure 14:
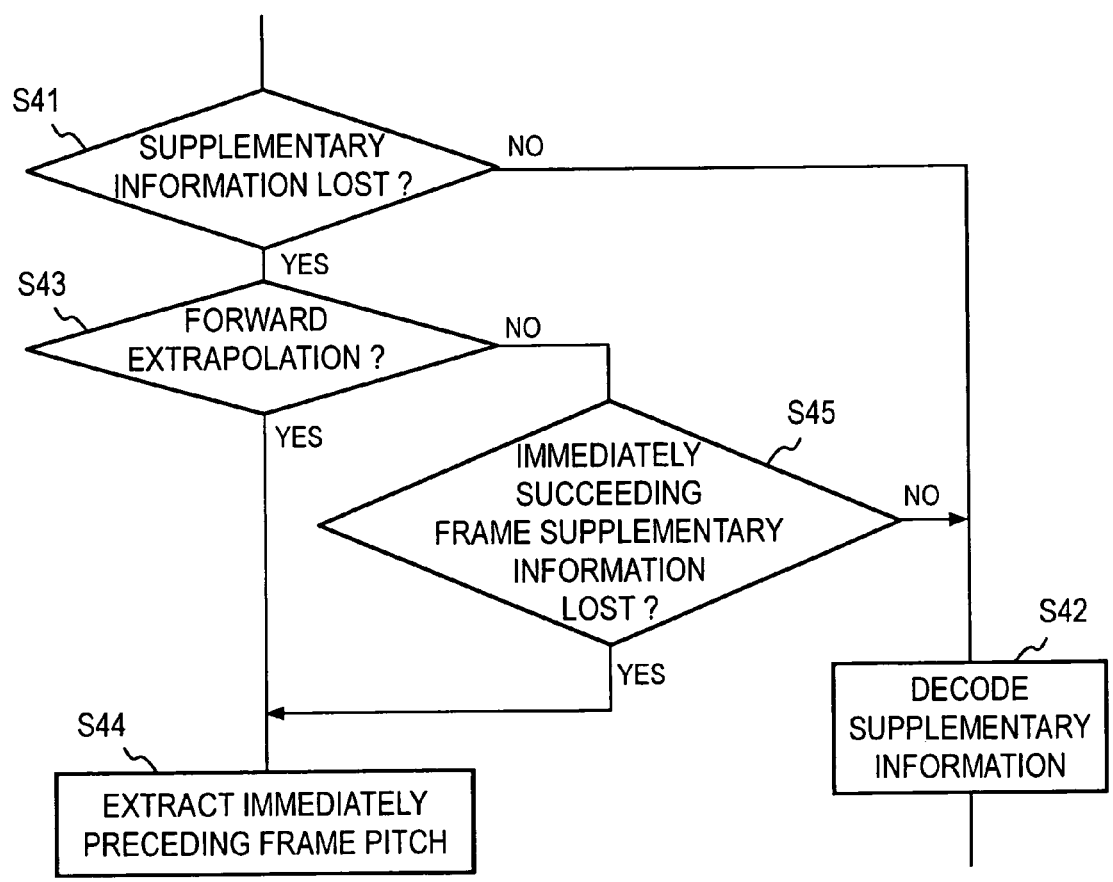
FIG. 14 shows an example of a process for selecting an acoustic feature parameter of an acoustic signal of a lost frame.
Figure 15:
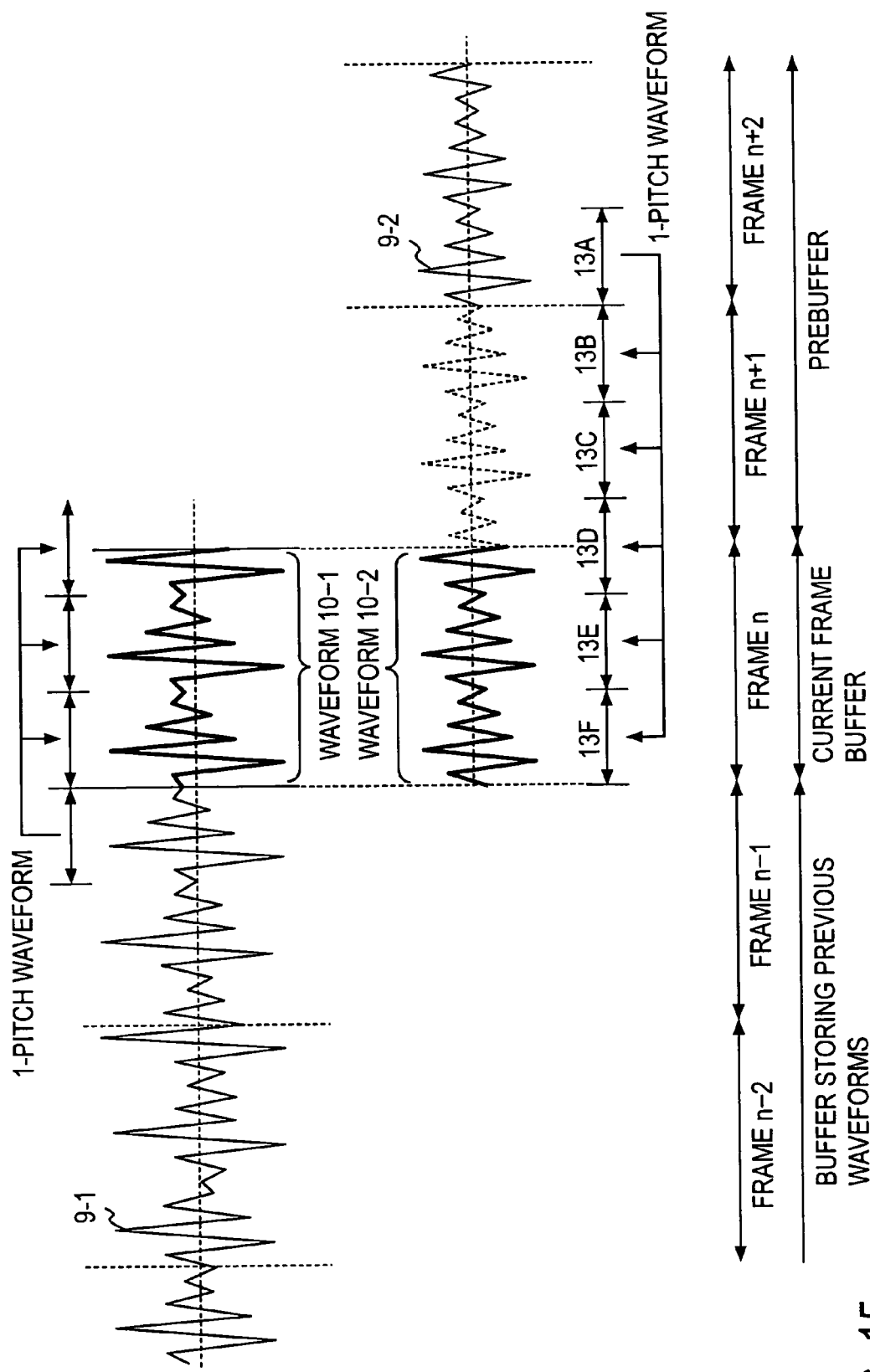
FIG. 15 is a waveform chart for illustrating backward waveform extrapolation processing performed when consecutive packet losses occur.

That is, if the packet containing supplementary information for the voice signal in the lost frame n has not been lost as shown in FIG. 14 for example (step S41), then the pitch length to be cut out for waveform extrapolation for generating the voice signal of the lost frame n is obtained by decoding the supplementary information (step S42). If the packet having the supplementary information added has been lost, the determination is made as to whether the extrapolation is forward extrapolation (step S43). If so, the output voice signal in the immediately preceding frame n−1 is analyzed to obtain the pitch length and the pitch length is used (step S44). Otherwise, a packet to which supplementary information for the voice signal in the immediately succeeding frame n+1 is added is searched for. If it has not been lost, then the process proceeds to step 42, where the supplementary information is decoded and the pitch length is used. If supplementary information for the voice signal in frame n+1 also cannot be obtained, then the process proceeds to step S44. FIG. 12 shows a conceptual diagram of the processing by the forward waveform extrapolation unit 51 and the backward extrapolation unit 52. Reference numeral 9-1 denotes a previous waveform and 9-2 denotes a forward-predicted waveform. In the forward waveform extrapolation, one pitch length of waveform 10A1 cut out from the voice signal in frame n−1 is repeated as indicated by segments 10B1, 10C1, and 10D1 to generate a waveform 10-1. In the backward waveform extrapolation, one pitch length of waveform 10A2 cut out from the voice signal in frame n+1 is repeated as indicated by segments 10B2, 10C2, and 10D2 to generate a waveform 10-2. Waveform 9-2 in FIG. 15 shows an image of the backward extrapolation in the case where the packets of the consecutive frames n and n+1 have been lost and frame n+2 has been successfully received. In this case, 1-pitch waveform 13A is cut out from the voice signal in frame n+2 and is repeated, starting at the end of frame n+1 that is closer to frame n+2 to the end of frame n−1 that is closer to frame n, as segments 13B, 13C, . . . , 13 F, to obtain an extrapolation waveform 10-2 of frame n.

Figure 5:
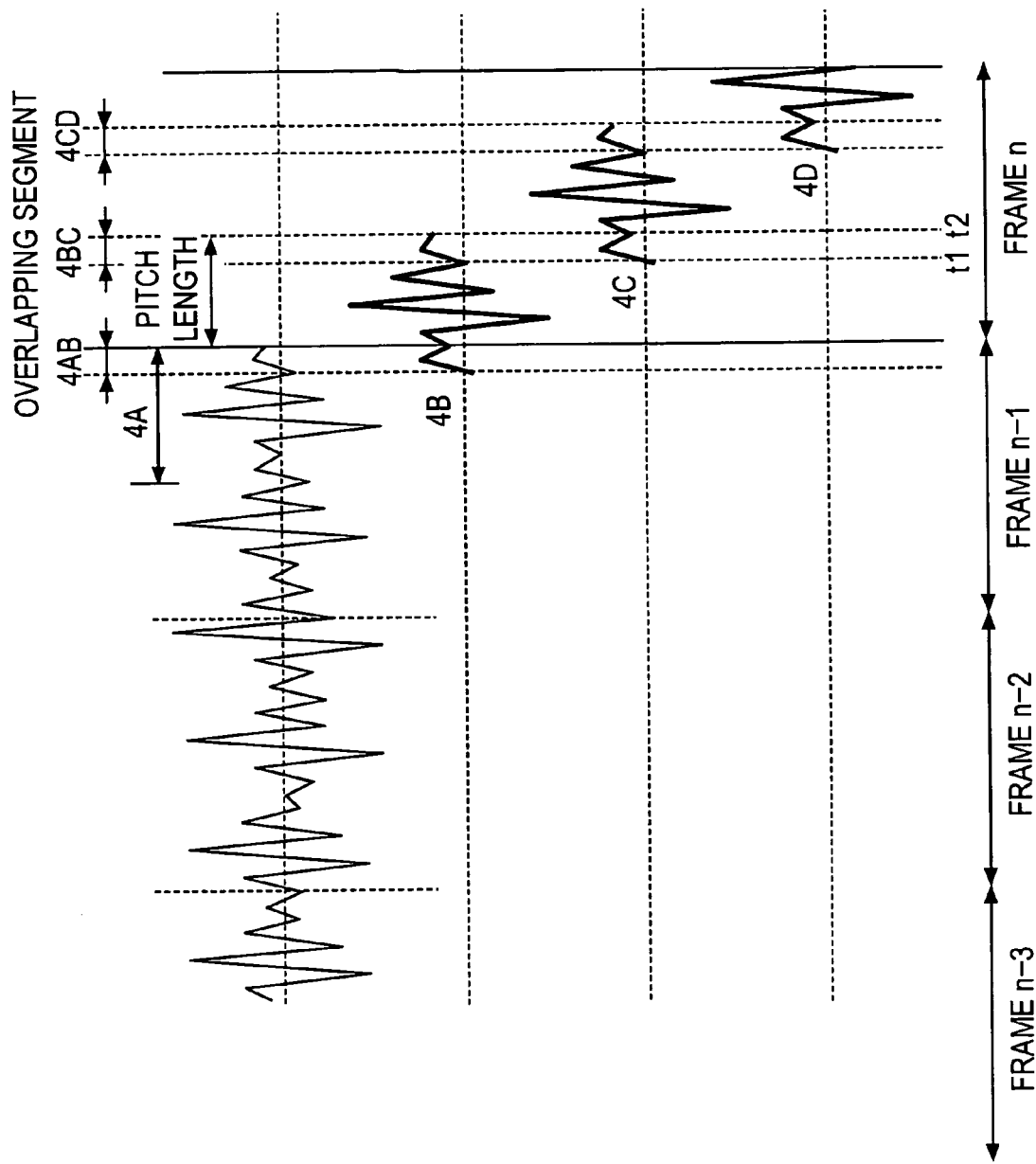
FIG. 5 is a waveform chart for illustrating an overlap-add processing for preventing discontinuous sound which is generated when a waveform is created by repeating a pitch waveform in FIG. 4.
Figure 6:
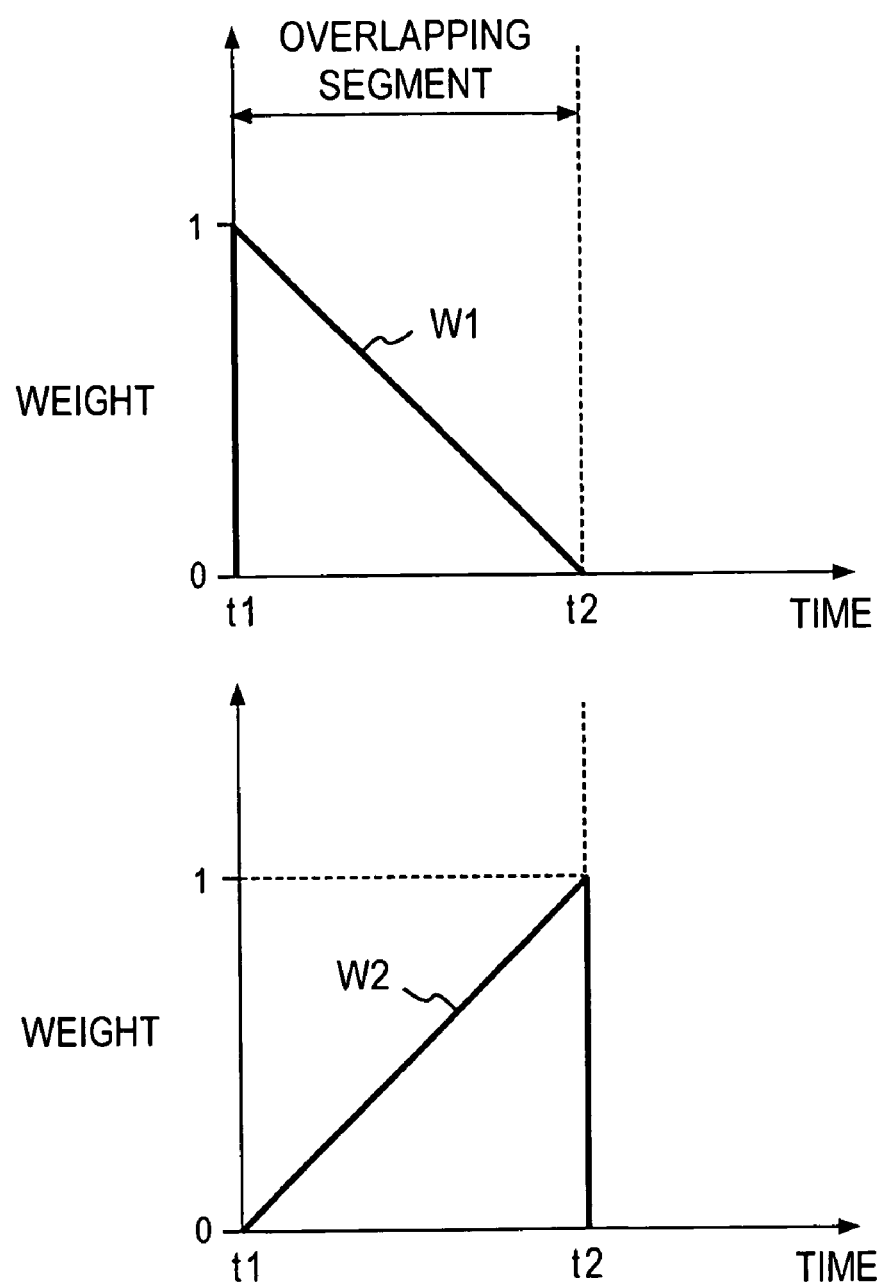
FIG. 6 shows an example of a triangle window function used in the overlap-add processing.
Figure 16:
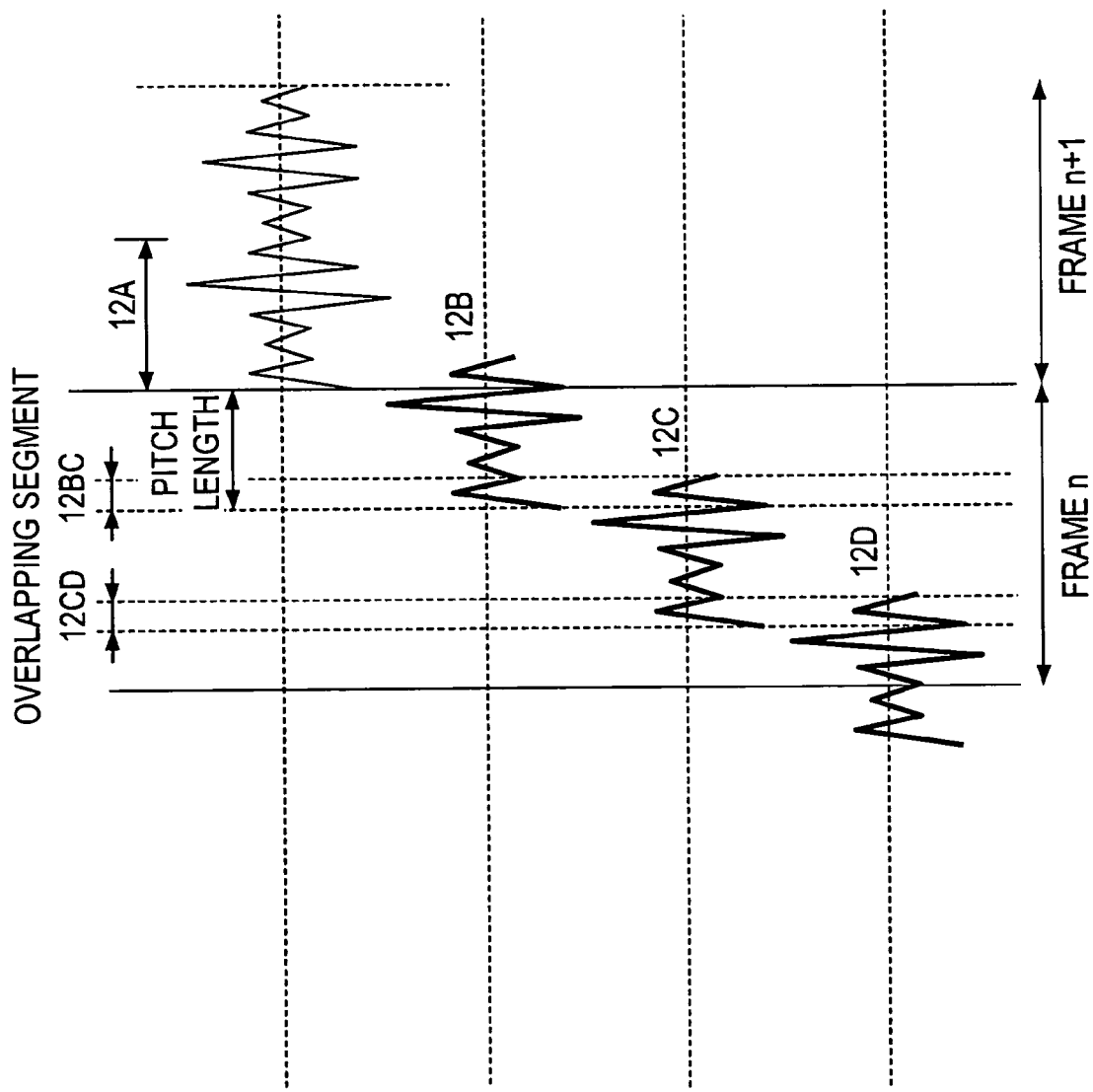
FIG. 16 is a waveform chart for illustrating overlap-add processing for backward waveform extrapolation.

As described with respect to FIG. 5 in the description of the method in Non-patent literature 1, audible discontinuities would occur at connection points if one pitch length of waveform cut out were simply repeated. Therefore, in forward waveform extrapolation, an overlap-add (OLA) operation may be used with overlapping segments as in FIG. 5. Similarly, an OLA operation can be implemented in backward extrapolation as shown in FIG. 16 in the reverse direction on the time axis in FIG. 5.

As shown in FIG. 13, waveforms 10-1 and 10-2 are multiplied by weights W1 and W2, respectively, in a multiplying units 53 and 54, respectively, and the products are added together in an adding unit 55 to produce a waveform yn (step S34). Each of the weights W1 and W2 may be simply set to ½ or may be determined on the basis of the "reliability" of waveforms 10-1 and 10-2 in a weight determining unit 56 (step S34). On the basis of "the reliability" means that the smaller one of the difference between the frame number of the last frame that has been successfully received and that of the current frame n and the difference between the frame number of the frame of a received packet found in the receiving buffer 212 that has a timestamp after the current time and that of the current frame n is considered to be indicative of higher reliability. Using such "reliability" is useful in the case of burst packet losses. Examples will be given below.

First example: If the packet of the preceding frame n−1 has not been lost, the packet of frame n has been lost, and the packet of the immediately succeeding frame n+1 has not been lost, then the forward extrapolation waveform 10-1 and backward extrapolation waveform 10-2 are considered to have the same "reliability" and therefore each of the weights are set to ½.

Second example: The packet of the preceding frame n−1 has not been lost, the packet of frame n has been lost, the packet of the immediately subsequent frame n+1 has been lost, and the packet of frame n+2 subsequent to frame n+1 has not been lost, then the "reliability" of the forward extrapolation waveform 10-1 obtained from the preceding frame n−1 through forward waveform extrapolation is likely to be higher than that of the backward extrapolation waveform 10-2. Accordingly, the weight by which the forward extrapolation waveform 10-1 is multiplied is set to ⅔, the weight by which the backward extrapolation waveform 10-2 is multiplied is set to ⅓. The ratio between the reliabilities is considered to be 2:1 because the ratio between distances from the closest preceding frame n−1 and the closest succeeding frame n+2 each packet of which has been successfully received to frame n of which a voice signal is about to be generated is 1:2.

Third example: If frame n−3 has been received successfully, the packets of the frames n−2 and n−1 have been consecutively lost, the packet of frame n has been lost, and the packet of frame n+1 has not been lost, then the backward extrapolation waveform 10-2 is likely to have the higher reliability than that of the forward extrapolation waveform 10-1. The weight by which the forward extrapolation waveform 10-1 is multiplied is set to ¼ and the weight by which the backward extrapolation waveform 10-2 is multiplied is set to ¾. The ratio between the reliabilities is considered to be 1:3 because the ratio between distances from the closest preceding frame and succeeding frame each packet of which has been successfully received to frame n of which a voice signal is about to be generated is 3:1. Therefore, for example, the difference $\Delta n1$ between frame n of which a voice signal is about to be generated and preceding frame $n_B$ the packet of which has been successfully received and the difference $\Delta n2$ between frame n and the succeeding frame $n_L$ the packet of which has been successfully received are calculated in difference circuits 56a and 56b, respectively, in the weight determining unit 56 in FIG. 13. The differences $\Delta n1$ and $\Delta n2$ are added together in a sum circuit 56c. Difference $\Delta n2$ is divided by the sum to obtain the weight $W1=\Delta n2/(\Delta n1+\Delta n2)$ for the forward extrapolation waveform 10-1 in a divider circuit 56d. Difference $\Delta n1$ is divided by the sum to obtain the weight $W2=\Delta n1/(\Delta n1+\Delta n2)$ for the backward extrapolation waveform 10-2 in a divider circuit 56e.

All sample points of the forward extrapolation waveform 10-1 and all sample points of the backward extrapolation waveform 10-2 are multiplied by the same weight in a frame in the example just described. However, the distance from a frame the packet of which has been successfully received to each sample point may be determined and a weight may be set for each sample point according to reliability.

A power correcting unit 57 in FIG. 13 corrects the power of the sum waveform yn by using power information obtained by decoding supplementary information for the voice signal of frame n (step S35) and outputs as the voice signal xn of the frame n to an output terminal 215 (step S36). Correcting the power means increasing or decreasing the amplitude of the sum waveform yn so that the power of the waveform yn becomes equivalent to the power indicated by the supplementary information. Here, the term "equivalent" means that the powers completely agree with each other or that the power of the voice signal xn outputted by taking account of effects of auditory perception is somewhat lower.

Remaining Buffer Amount and Delay Amount Control Information

The relation between the remaining buffer amount at the other end of communication and delay amount control information mentioned earlier will be described.

As the amount of delay (offset indicating how many frames after a voice signal frame its supplementary information is to be transmitted simultaneously with a voice signal frame) is increased, the signal becomes less susceptible to burst loss. However, if packet concealment processing (generation of the voice signal of a lost packet) is performed by using supplementary information at the receiving end, voice cannot be reproduced until the supplementary information arrives at the receiving end. Accordingly, the amount of delay (reproduction delay) between the reception of a voice packet to the actual reproduction of the voice signal increases. In the case of bidirectional communication, the amount of delay (call delay) between utterance at one end and reproduction of the utterance at the other end increases. If the amount of delay is small, reproduction delay is also small and the reproduction is resistant to discrete (random) packet losses. However, when burst loss occur, the supplementary information is also likely to be lost. That is, there is a tradeoff between the amount of delay and its effect. What is optimal in such a case is to receive information indicating how many packets of frames are presently stored in the receiving buffer at the other end of communication from the other end and to set the amount of delay equivalent to the number of frames of packets stored in the receiving buffer at the other end.

As mentioned earlier, in order to absorb jitter in packet arrival time, typically a given number of packets are stored in a receiving buffer. Especially when communication conditions of a packet communication network is not so good, the number of packets to be stored in the receiving buffer is typically increased at the other end to prevent audible discontinuities due to jitters in packet arrival. That is, there is inherent reproduction delay equivalent to the number of packets stored in the receiving buffer. Therefore, the effect of transmitting supplementary information can be maximized without adding reproduction delay, by setting the amount of delay to a value equivalent to the number of frames of packets stored in the receiving buffer (remaining buffer amount) at the other end and transmitting supplementary information delayed by the amount. If the amount of delay is smaller than or equal to the number of frames of packets stored in the receiving buffer at the other end, reproduction delay will not be added. Therefore, the amount of delay may be set to a value smaller than or equal to the number of the frames of packets stored in the receiving buffer at the other end, depending on the characteristics of expected burst packet losses. Given that the remaining buffer amount in the receiving buffer at the other end is varies moment to moment, the amount of delay may be set to a value one or two frames less than the remaining buffer amount at the other end.

A pitch period alone may be used as the acoustic feature. In that case, the power section 114*b* in FIG. 7, step S3*b* in FIG. 9, step S35 in FIG. 10, and the power correcting unit 57 in FIG. 13 are omitted. An inputted PCM acoustic signal, for example, may be included in packets as is without coding the acoustic signal waveforms at the sending end. In that case, the voice waveform coding unit 112 in FIG. 7, the voice packet decoding unit 213 and the look-ahead voice waveform decoding unit 222 in FIG. 8, step S2 in FIG. 9, and steps S24 and S26 in FIG. 10 are omitted. Furthermore, acoustic features are obtained typically by digital computations and the need for encoding the acoustic features can be eliminated by allowing the results of the computations to be obtained in 8 bits, for example. Therefore, the voice feature coding unit 115 in FIG. 7, the voice feature decoding unit 223 in FIG. 8, step S4 in FIG. 9, and step S29 in FIG. 10 can be omitted.

If the preceding and succeeding packets has been correctly received and only the packet of frame n has been lost, then only one of the forward extrapolation waveform 10-1 and the backward extrapolation waveform may be used for generating the lost signal. If bursty packet losses occur, the forward extrapolation waveform may be used only for the acoustic signal of the immediately succeeding frame that has been received successfully and the backward extrapolation waveform may be used only for the acoustic signal of the immediately preceding frame that has been received successfully.

Each of the voice signal transmitting apparatus 100 shown in FIG. 7 and the voice signal receiving apparatus 200 shown in FIG. 8 may be caused to function by a computer. In that case, an acoustic signal packet transmitting program or an acoustic signal packet receiving program for causing the computer to perform the steps of the process of the packet transmitting method shown in FIG. 9 or the steps of the process of the packet receiving method shown in FIG. 10 may be installed in the computer from a recording medium such as a CD-ROM, a magnetic disk, or a semiconductor storage, or may be downloaded through a communication network, and then the computer may be caused to execute the program.

Second Embodiment

In the first embodiment, inclusion and transmission of voice features in a packet different from a voice signal frame, the use of the remaining buffer amount at the receiving end to control the amount of delay of voice features with respect to the voice signal, and a method for generating a lost frame when a packet loss occurs have been described with respect to the voice signal transmitting apparatus 100 and voice signal receiving apparatus 200. In a second embodiment, a method for controlling the amount of delay by using information other than a remaining buffer amount will be described. Furthermore, information included and transmitted in a packet different from a voice signal packet is not limited to voice features but instead they will be described as data corresponding to an acoustic signal (hereinafter referred to as "acoustic signal corresponding data"). This is because when a packet is lost, the lost frame may be generated in a method other than generating from acoustic features. For example, in the simplest method, the acoustic signal corresponding data may be an acoustic signal itself (that is, an acoustic signal is transmitted twice). In this case, instead of generating a lost frame, the acoustic signal of the same frame as the lost frame that has been transmitted in another packet may be used as is.

Voice Signal Transmitting Apparatus and Voice Signal Receiving Apparatus

Figure 17:
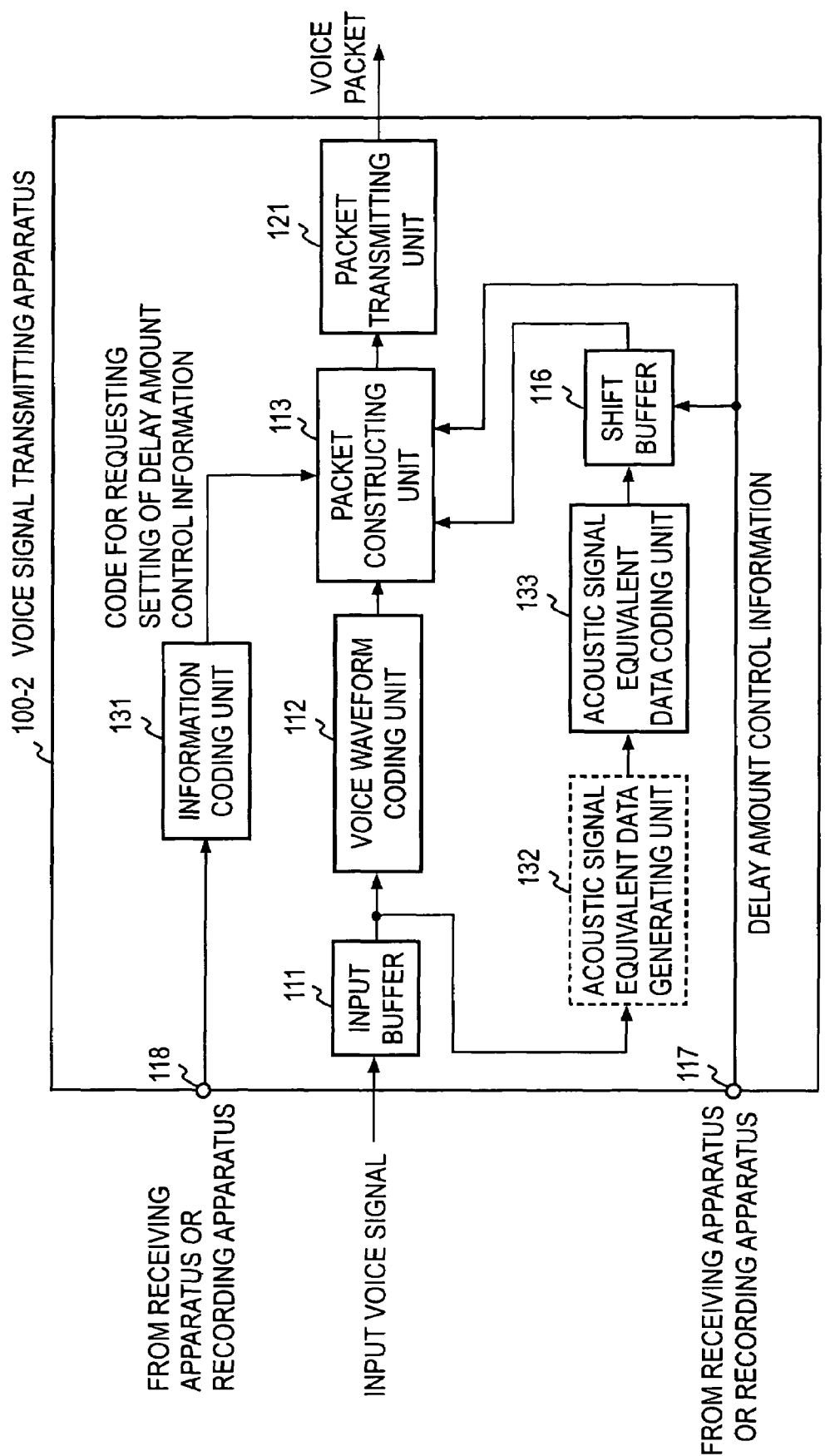
FIG. 17 shows an exemplary functional configuration of a voice signal transmitting apparatus 100-2 according to the present invention.

FIG. 17 shows an exemplary functional configuration of a voice signal transmitting apparatus 100-2. This apparatus differs from the voice signal transmitting apparatus 100 shown in FIG. 7 in that the apparatus is provided with an information coding unit 131 in place of the remaining buffer amount coding unit 119, an acoustic signal corresponding data generating unit 132 in place of the voice feature calculating unit 114, and an acoustic signal corresponding data coding unit 133 in place of the voice feature coding unit 115. The operational process is the same as the one shown in FIG. 9, except that the remaining buffer amount is just replaced with information received at a terminal 118 and the supplementary information is replaced with acoustic signal corresponding data. The terminal 118 is used for receiving information for controlling a communication apparatus at the other end of communication. The terminal 118 receives information from a voice signal receiving apparatus provided in combination with the voice signal transmitting apparatus 100-2, or predetermined information in a recording device. The information may include, but not limited to, the number of packets stored in a receiving buffer of the voice signal receiving apparatus (remaining buffer amount), information about jitters of packets received by the voice signal receiving apparatus, the number of consecutive frames of packets lost in a bursty loss (the number of consecutive packet losses) detected by the voice signal receiving apparatus, the number of packets to be stored in the receiving buffer (the targeted value of the number of stored packets) which can be obtained from the jitter information or the number of consecutive packet losses, or a predetermined constant number stored in a recording device. These items of information will be collectively referred to as information for requesting the setting of delay amount control information.

Figure 18:
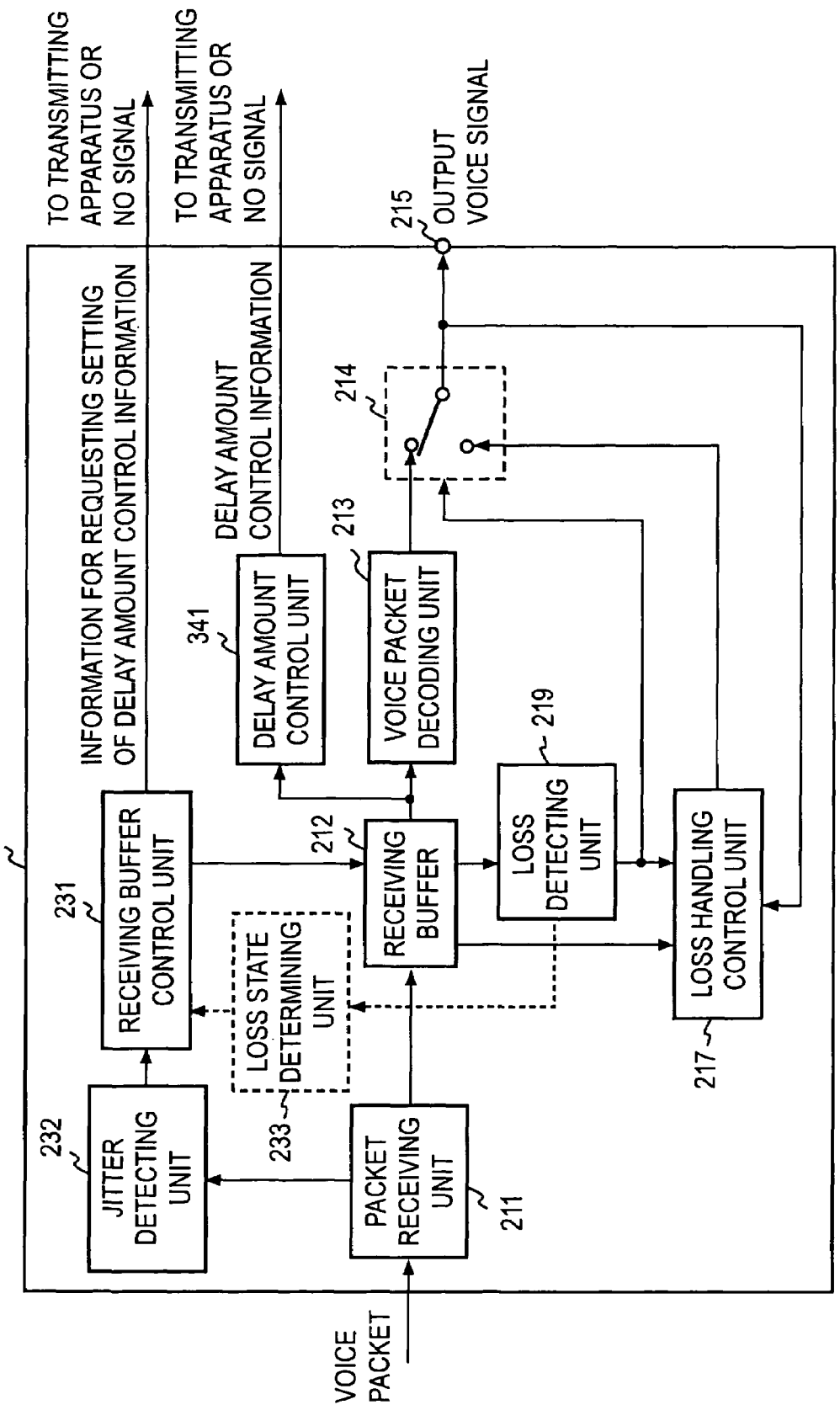
FIG. 18 shows an exemplary functional configuration of a voice signal receiving apparatus 200-2 according to the present invention.

FIG. 18 shows an exemplary functional configuration of a voice signal receiving apparatus 200-2. This apparatus differs from the voice signal receiving apparatus 200 shown in FIG. 8 in that a delay amount control unit 341 is provided in place of the remaining buffer amount decoding unit 216, jitters are detected in a packet receiving unit 211 (a jitter detecting unit 232) instead of determining the remaining buffer amount in the receiving buffer 212 by the remaining receiving buffer amount determining unit 218, the number of packets to be stored in a receiving buffer 212 (the targeted value of the number of stored packets) is determined, and the receiving buffer 212 is controlled (a receiving buffer control unit 231) so that the number of packets actually stored in the receiving buffer 212 (remaining buffer amount) approaches the targeted value of the number of stored packets. A delay amount control unit 341 extracts information for requesting the setting of delay amount control information from a packet transmitted from a voice signal transmitting apparatus at the other end of communication. The delay amount control unit 341 also determines the amount of delay at a voice signal transmitting apparatus provided in combination with the voice signal receiving apparatus 200-2 and provides it to the terminal 117. The amount of delay can be determined from the targeted value of the number of stored packets by replacing the remaining buffer amount used in the above-described method for determining the amount of delay from the remaining buffer amount with the targeted value of the number of stored packets. Although setting the targeted value of the number of stored packets requires a certain amount of transition time between the start of control operation for changing the number of stored packets and the completion of the change, it is taken into consideration that actual remaining buffer amount reaches a targeted value of the number of stored packets after a certain amount of time elapses. The information sent from the receiving buffer control unit 231 to the voice signal transmitting apparatus provided in combination with the voice signal receiving apparatus 200-2 is the targeted value of the number of the stored packets in stead of a remaining buffer amount. An actual remaining buffer amount is controlled in such a manner that it approaches the targeted value of the number of stored packets. However, under varying network conditions such as jitters, it takes some time for an actual remaining buffer amount to reach a changed targeted value. Therefore, an actual remaining buffer amount will be equal to the targeted value of the number of stored packets at a certain point of time but will be greater or less than the targeted value of the number of stored packets in another point of time. A loss state determining unit 233 may be provided for determining the number of stored packet by taking into consideration packet losses. Specifically, the loss state determining unit 233 also receives information about packet losses detected at the loss detecting unit 219 and obtains the maximum value of the number of consecutively lost packets in a bursty loss (hereinafter referred to as "the number of consecutive packet losses"). The receiving buffer control unit 231 determines the targeted value of the number of stored packets from both information about jitters and the number of consecutive packet losses.

A method for determining the targeted value of the number of stored packets from jitters will be described below. For example, if the frame length is 20 milliseconds, packets would be received every 20 milliseconds unless there are jitters. However, the interval between arrivals of packets may be 40 milliseconds or 5 milliseconds or even 100 milliseconds depending on the conditions of the network. The jitter detecting unit 232 determines that the jitter time is 0 milliseconds if the interval between arrivals of packets is 20 milliseconds per frame. If the interval between arrivals of packets is 100 milliseconds per frame, then the jitter detecting unit 232 determines that the jitter time is 80 milliseconds. If the interval between arrivals of packets is 5 milliseconds, it is probably because the arrival of the immediately preceding packet has delayed due to jitters, and the jitter detecting unit 232 determines the jitter time is −15 milliseconds or an absolute value of 15 milliseconds. Time series of jitter times observed moment to moment in this way are used to obtain the maximum value of jitters for each frame (for example every 20 milliseconds) in a given past period of time (for example, in 2 seconds). The maximum value may be obtained from time series of jitter times by storing jitter times over a given period of time and finding the maximum value among the jitter times. The maximum value of jitter times is sent to the receiving buffer control unit 231. The receiving buffer control unit 231 controls the remaining buffer amount in a receiving buffer so that it approaches a targeted value of the number of stored packets, which is the number of frames equivalent to the obtained maximum value of jitter times, that is, the maximum value of jitter times divided by the frame length (fractions rounded up to an integer) or the number of frames equivalent to the quotient plus 1. Alternatively, the targeted value of the number of stored packets may be obtained by the use of a table showing the correspondence between the maximum value of jitter times and the targeted value of the number of stored packets as shown in FIG. 19. The targeted value of the number of stored packets is determined frame by frame. However, when the maximum value of jitter times has not changed, then the target value of the number of stored packets is also kept the same. It should be noted that obtaining the maximum value of jitter times in the given past period of time to determine the target value of the number of stored packets equivalent to the maximum value of jitter times is equivalent to obtaining the target value of the number of stored packets equivalent to each of the jitter times in time series to obtain the maximum value of the targeted value of the numbers of stored packets in the given period of time. In some cases, obtaining the maximum value in a range of targeted values (the latter method) can increase the efficiency of the process for finding the maximum value.

A targeted value of the number of stored packets can be obtained from packet losses for example as follows. The loss state determining unit 233 uses information about packet losses sent from the loss detecting unit 219 moment to moment to obtain the maximum value of the number of consecutive packet losses for each frame (for example every 20 milliseconds) in a given past period of time (for example 2 seconds). The maximum number of consecutive packet losses may be obtained from time series of packet loss information by storing the packet loss information over a given period of time and searching for the maximum value of the numbers of consecutive packet losses. The maximum value of the consecutive packet losses is sent to the receiving buffer control unit 231. The receiving buffer control unit 231 controls the remaining buffer amount in the receiving buffer so that it approaches a targeted value, which may be the number of frames equivalent to the maximum value of the numbers of consecutive packet losses obtained or the number of frames equivalent to that maximum value plus 1. The targeted value of the number of stored packet is determined frame by frame. However, when the maximum value of the number of consecutive packet losses has not changed, then the target value of the number of stored packets is also kept the same. The target value of the number of stored packets may be obtained from both jitter time and the number of consecutive packet losses by selecting the targeted value of the number of stored packets determined from the jitter time or the targeted value of the number of stored packets determined from the number of consecutive packet losses, whichever is greater.

Figure 20:
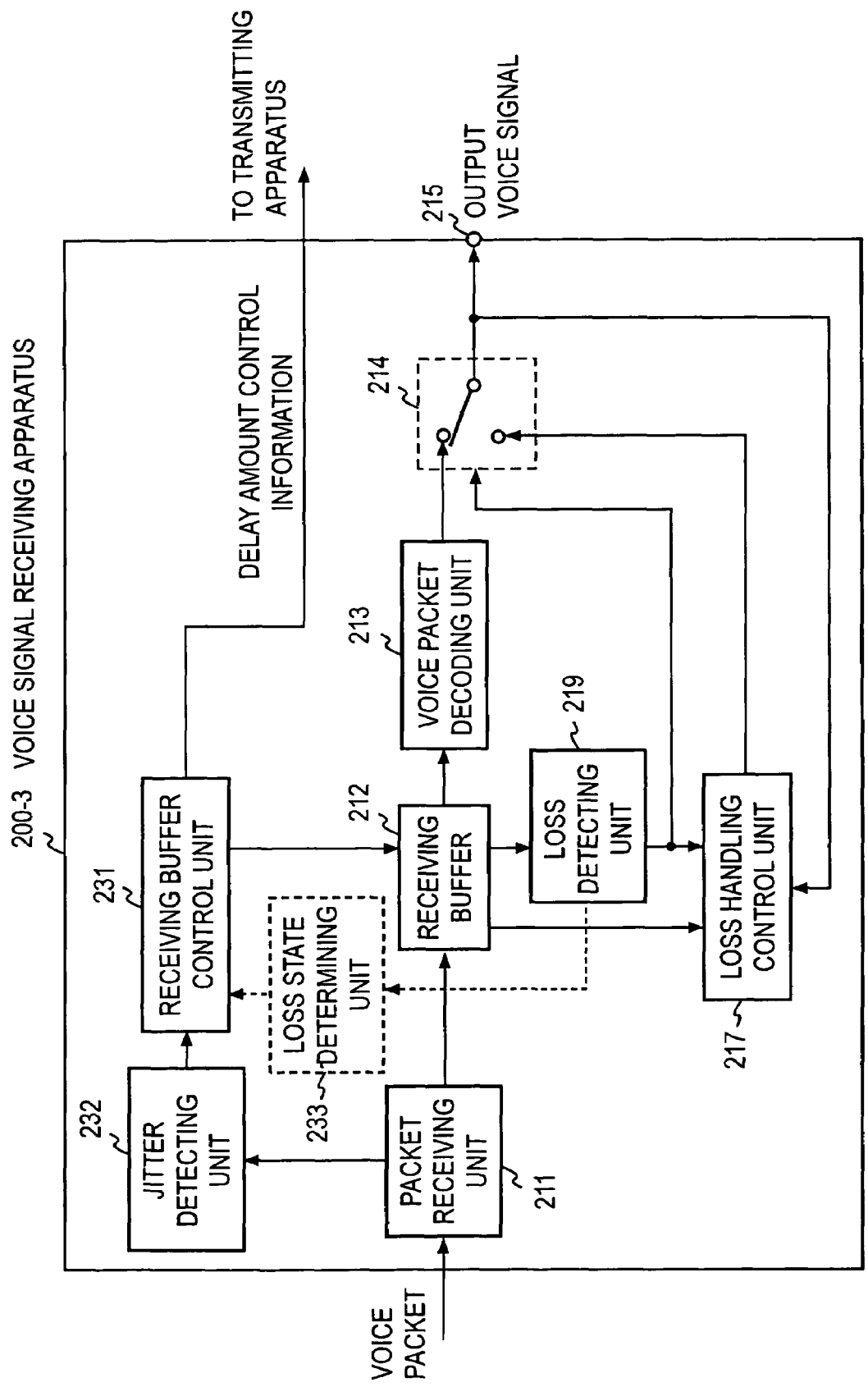
FIG. 20 shows an exemplary functional configuration of a voice signal receiving apparatus 200-3 according to the present invention.

FIG. 20 shows a variation of the voice signal receiving apparatus 200-2 shown in FIG. 18. Packets are transmitted bidirectionally when voice signals are communicated bidirectionally over a packet communication network. It is assumed in the functional configuration that the conditions of the communication network are the same in both directions. The amount of delay at a voice signal transmitting apparatus provided in combination with the voice signal receiving apparatus 200-3 is determined based on jitter time of packets transmitted from the other end of the communication or the number of consecutive packet losses, and information for requesting the setting of delay amount control information is not transmitted to the other end of the communication. In this functional configuration, there is no input into the terminal 118 of the voice signal transmitting apparatus 100 or 100-2.

Figure 21:
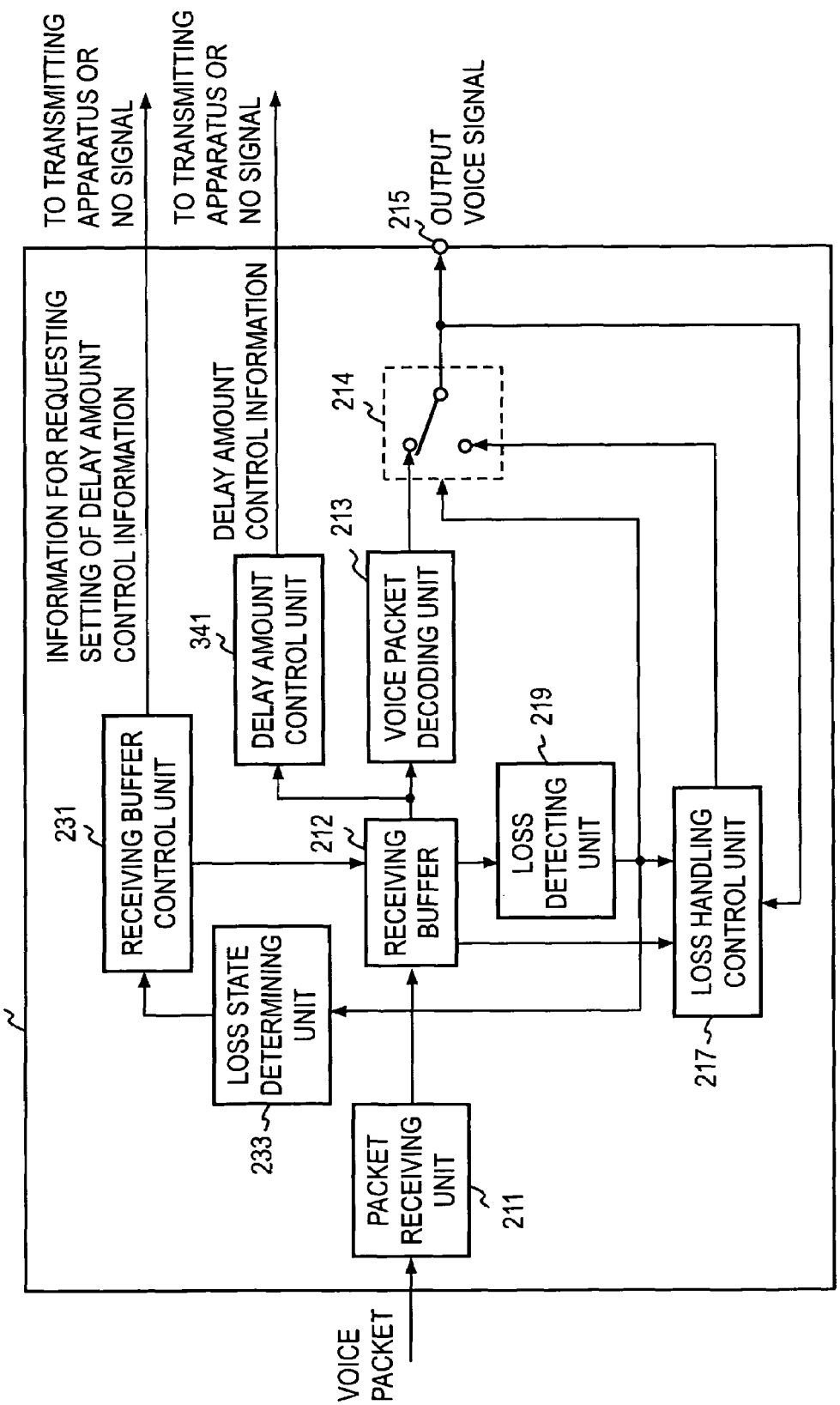
FIG. 21 shows an exemplary functional configuration of a voice signal receiving apparatus 200-4 according to the present invention.
Figure 22:
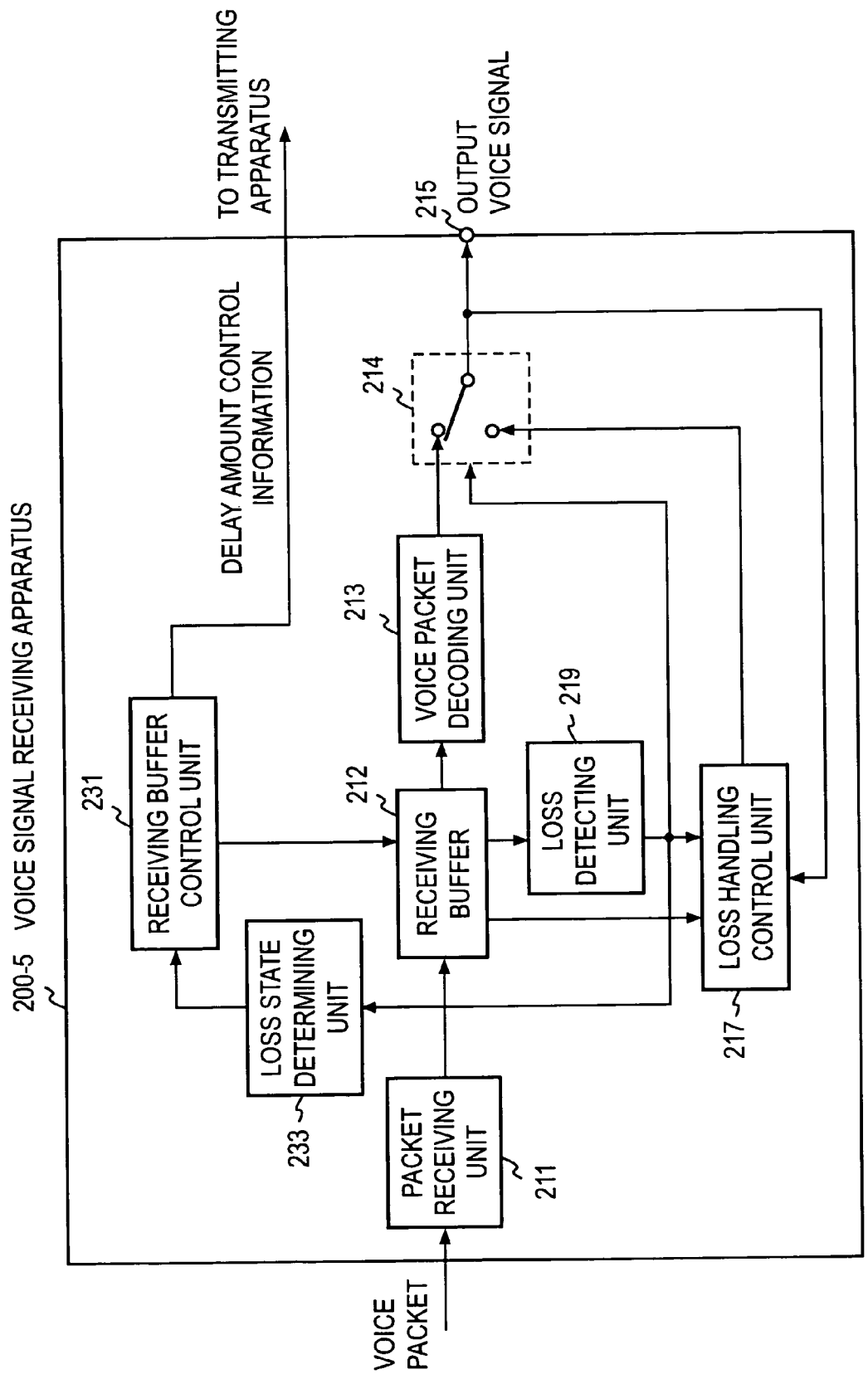
FIG. 22 shows an exemplary functional configuration of a voice signal receiving apparatus 200-5 according to the present invention.

FIGS. 21 and 22 show examples in which the number of stored packets is determined only from the number of consecutive packet losses. The examples differ from the examples shown in FIGS. 18 and 20 in that the jitter detecting unit 232 is omitted.

Figure 23:
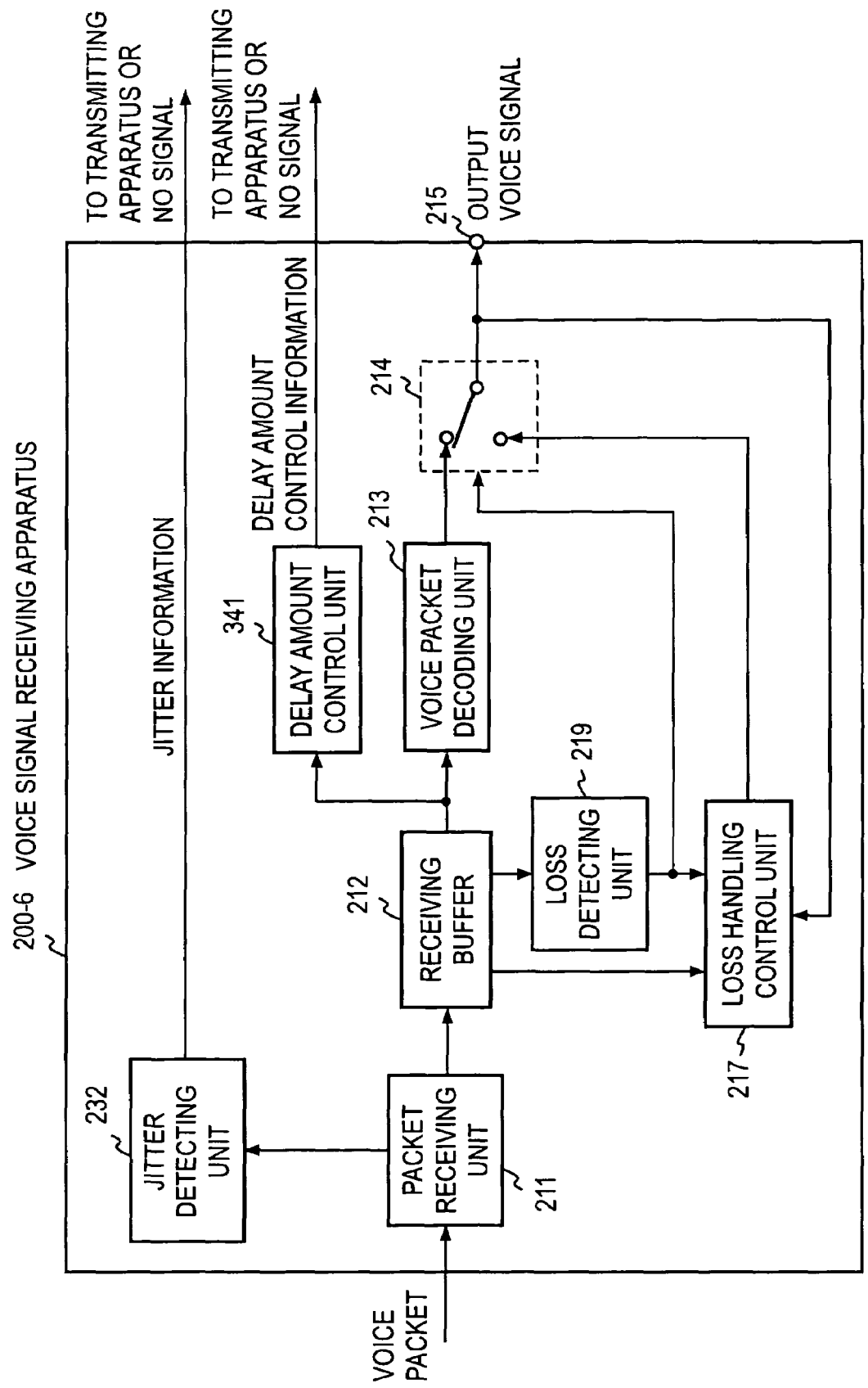
FIG. 23 shows an exemplary functional configuration of a voice signal receiving apparatus 200-6 according to the present invention.
Figure 24:
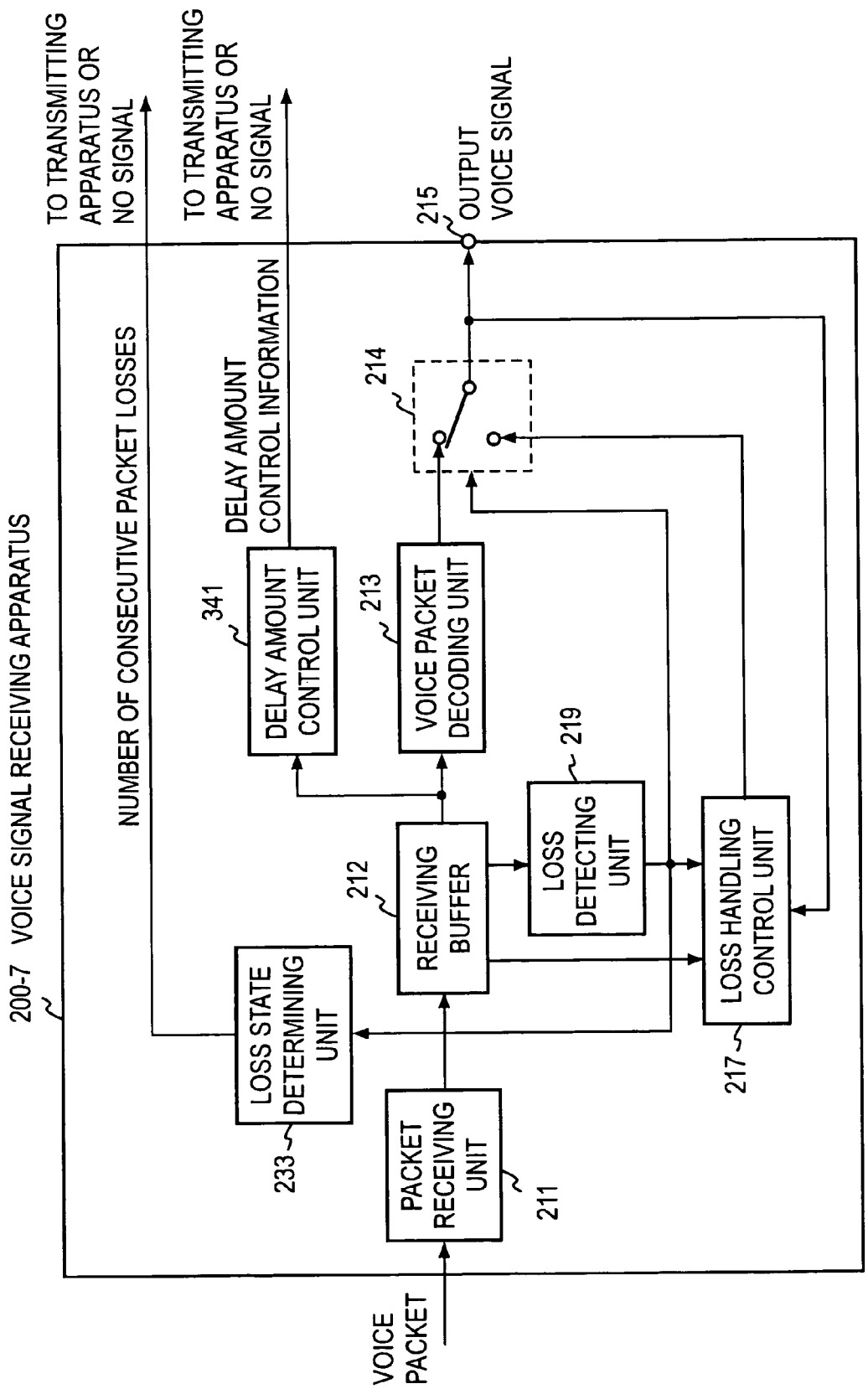
FIG. 24 shows an exemplary functional configuration of a voice signal receiving apparatus 200-7 according to the present invention.

FIGS. 23 and 24 show exemplary configurations in which the number of packets to be stored in a receiving buffer 212 is determined from delay amount control information included in a received packet. The receiving buffer control unit 231 is omitted in this case. For example, the number of packets stored in the receiving buffer 212 sets to a value greater by 1 than the value of the delay amount control information included in a packet. In the example shown in FIG. 23, jitter information is information indicating the reception status to the other end of communication. In the example shown in FIG. 24, the number of consecutive packet losses is information indicating the reception status to the other end of communication.

Voice Signal Communication System

Figure 25:
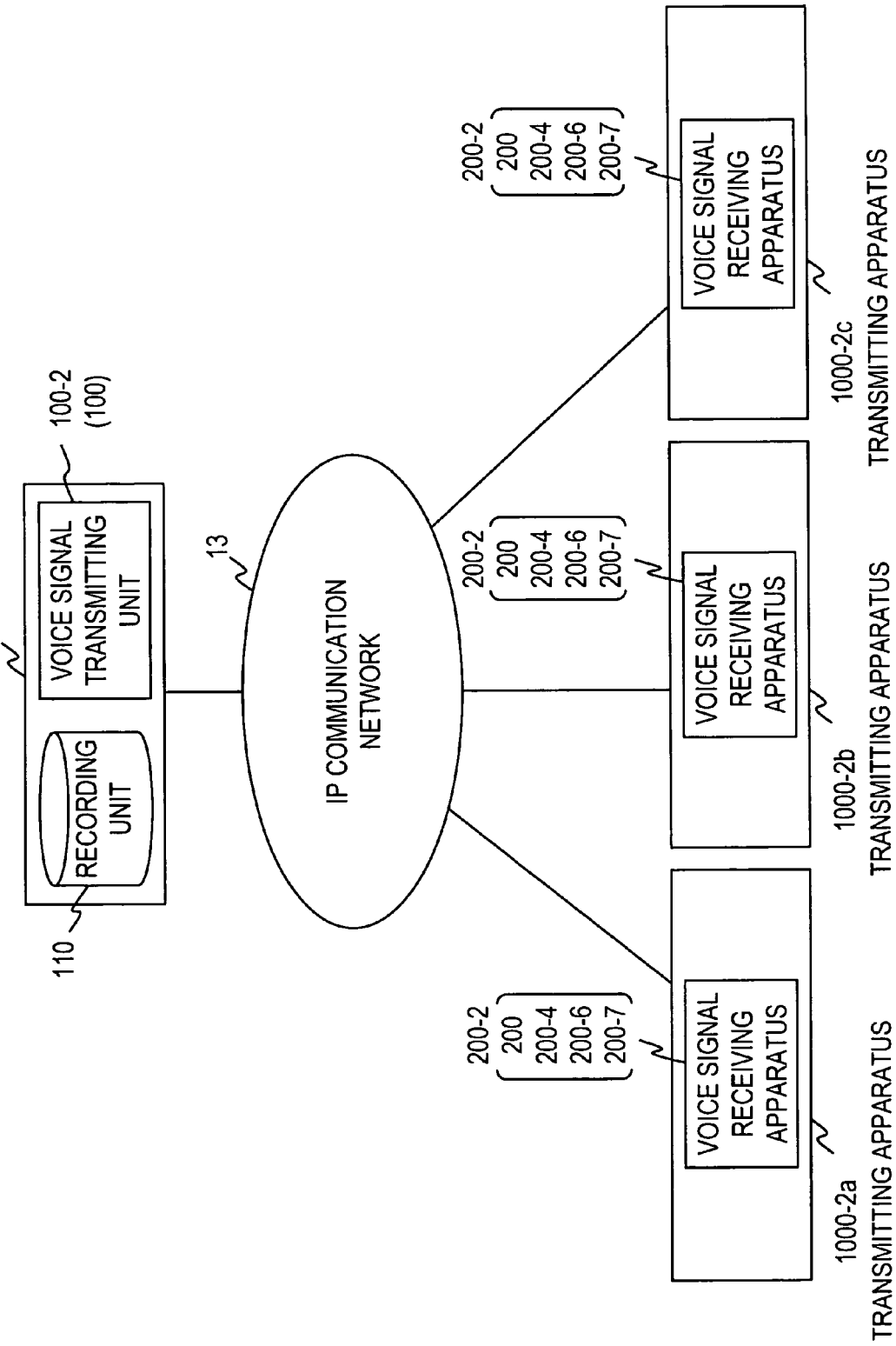
FIG. 25 shows an exemplary system configuration where voice packets are transmitted in one direction.

FIG. 25 shows an exemplary configuration of a system in which voice packets are transmitted in one direction. A communication apparatus 1000-1 consists of a voice signal transmitting apparatus 100-2 and a recording unit 110. The voice signal transmitting apparatus may be the voice signal transmitting apparatus denoted earlier by reference numeral 100. The recording unit 110 has at least delay amount control information recorded in it beforehand and provides the delay amount control information to the terminal 117 of the voice signal transmitting apparatus 100-2 (or 100). A communication apparatus 1000-2 at a receiving end is composed of a voice signal receiving apparatus 200-2. The voice signal receiving apparatus may be the voices signal receiving apparatus 200, 200-4, 200-6, or 200-7. The initial value of the number of packets to be stored in a receiving buffer may be set to 1, for example. In the case of complete single directional communication as in this system configuration, an output signal from the voice signal receiving apparatus 200-2 to a transmitting apparatus is not required. Accordingly, the system may have a configuration in which the remaining buffer amount decoding unit 216 and the remaining receiving buffer amount determining unit 218 are omitted from the voice signal receiving apparatus 200, a configuration in which the delay amount control unit 341 is omitted from the voice signal receiving apparatuses 200-2 and 200-4, a configuration in which the delay amount control unit 341 and the jitter detecting unit 232 are omitted from the voice signal receiving apparatus 200-6, or a configuration in which the delay amount control information unit 341 and the loss state determining unit 233 are omitted from the voice signal receiving apparatus 200-7.

Figure 26:
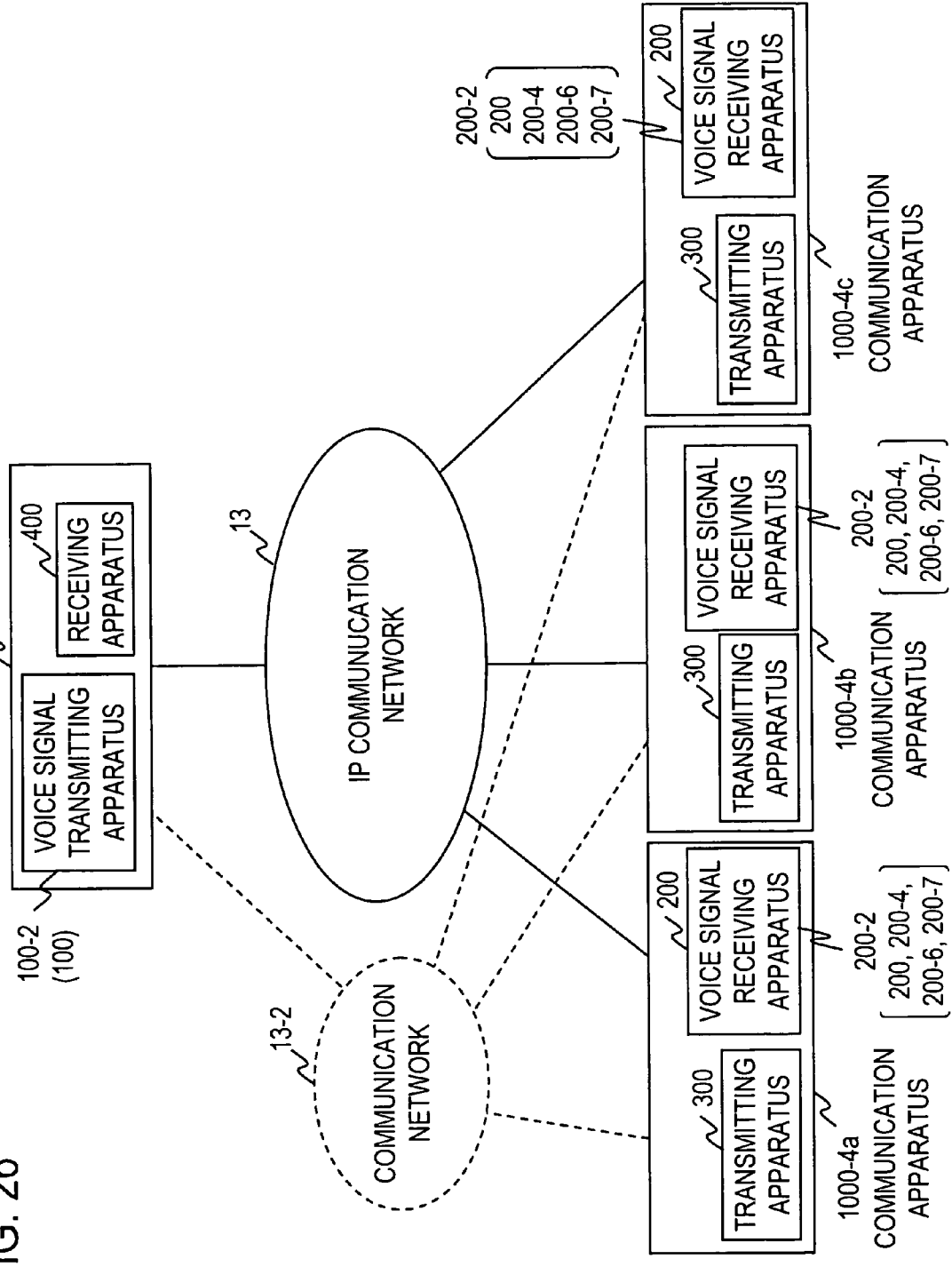
FIG. 26 shows an exemplary system configuration where voice packets are transmitted in one direction and a control signal is transmitted in the other direction.

FIG. 26 shows an exemplary configuration of a system in which voice packets are transmitted in one direction and information for requesting setting of delay amount control information is transmitted in the other direction. In this case, the information for requesting setting of delay amount control information may be transmitted through the same IP communication network 13 through which voice packets are transmitted or it may be transmitted through a different communication network 13-2. A communication apparatus 1000-3 at a voice packet sending end consist of a voice signal transmitting apparatus 100-2 and a receiving apparatus 400. The voice signal transmitting apparatus may be the voice signal transmitting apparatus denoted earlier by 100. The initial value of the amount of delay may be set to 1, for example. A communication apparatus 1000-4 at a voice signal receiving end consists of a voice signal receiving apparatus 200-2 and a transmitting apparatus 300. The voice signal receiving apparatus may be the voice signal receiving apparatus 200, 200-4, 200-6, or 200-7. The initial value of the number of stored packets may be set to 1, for example.

Figure 27:
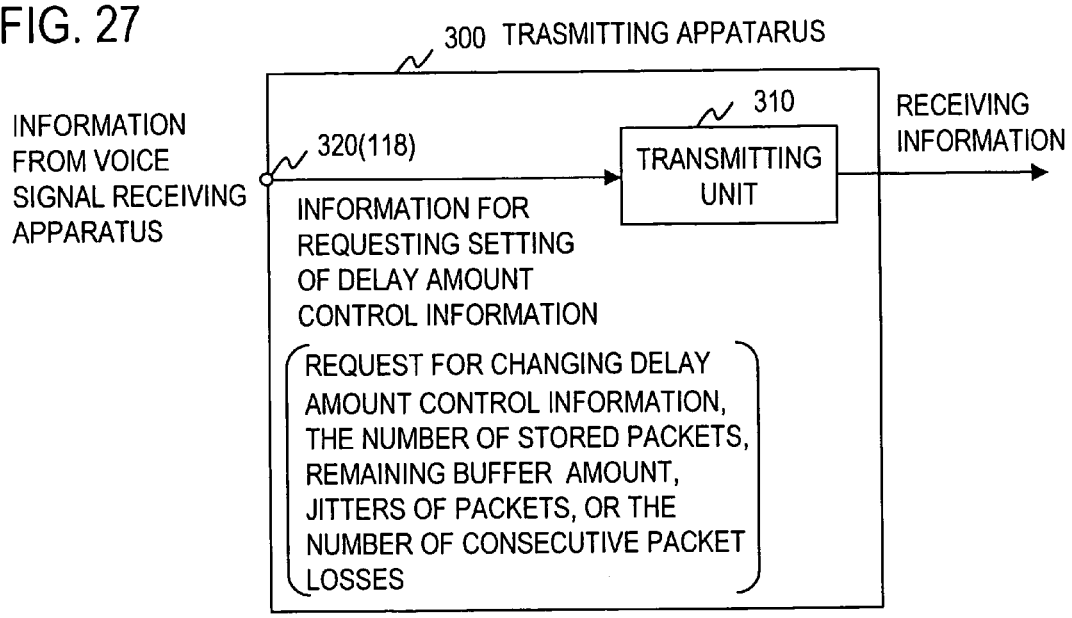
FIG. 27 shows an exemplary functional configuration of a transmitting apparatus 300.
Figure 28:
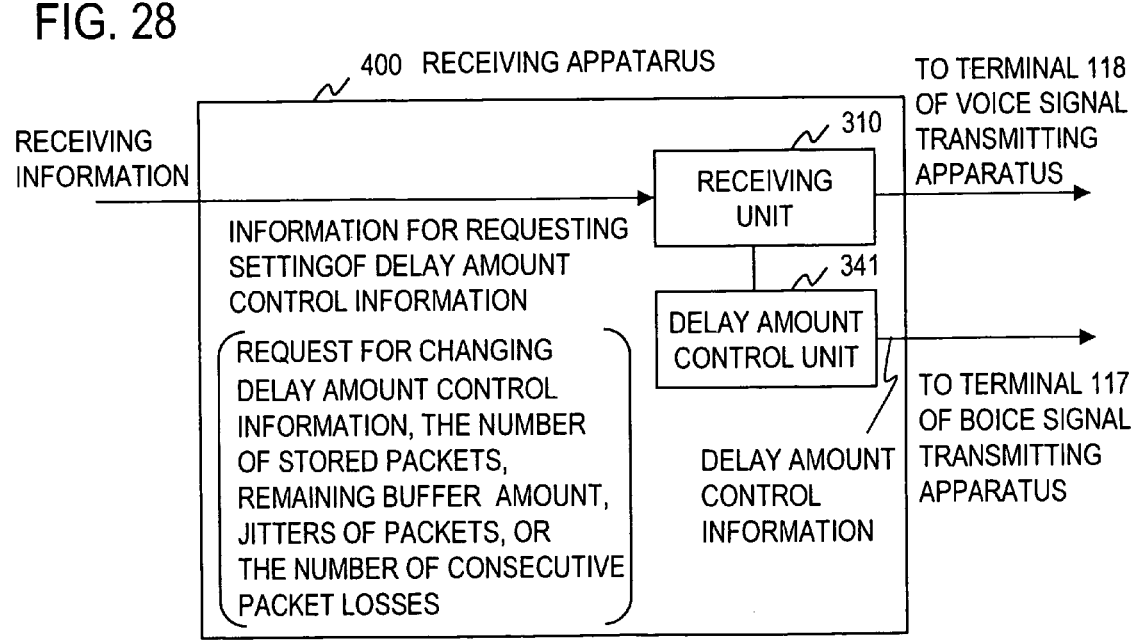
FIG. 28 shows an exemplary functional configuration of a receiving apparatus 400.

FIG. 27 shows an exemplary functional configuration of the transmitting apparatus 300 described above. FIG. 28 shows an exemplary configuration of the receiving apparatus 400 described above. A terminal 320 of the transmitting apparatus 300 is equivalent to the terminal 118 of the voice signal transmitting apparatus 100-2. Information from the voice signal receiving apparatus 200-2 is inputted into a transmitting unit 310 through the terminal 320. The transmitting unit 310 converts the received information into a format for the protocol of a communication network 13 (or 13-2) and transmits it to a communication apparatus 1000-3. The information from the voice signal receiving apparatus herein is information for requesting setting of delay amount control information (such as information for requesting to change delay amount control information, the number of stored packets, remaining buffer amount, jitters of packets, or the number of consecutive packet losses). A receiving apparatus 400 receives information from a communication apparatus 1000-4 at a voice packet receiving end. The received information is inputted into a receiving unit 410 and information for controlling the communication apparatus 1000-4 at the receiving end is provided to the terminal 118 of the voice signal transmitting apparatus. Information used for internal control of the communication apparatus 1000-3 at the sending end is provided to a delay amount control unit 341. The delay amount control unit 341 generates delay amount control information from the received information and provides it to the terminal 117 of the voice signal transmitting apparatus.

Figure 29:
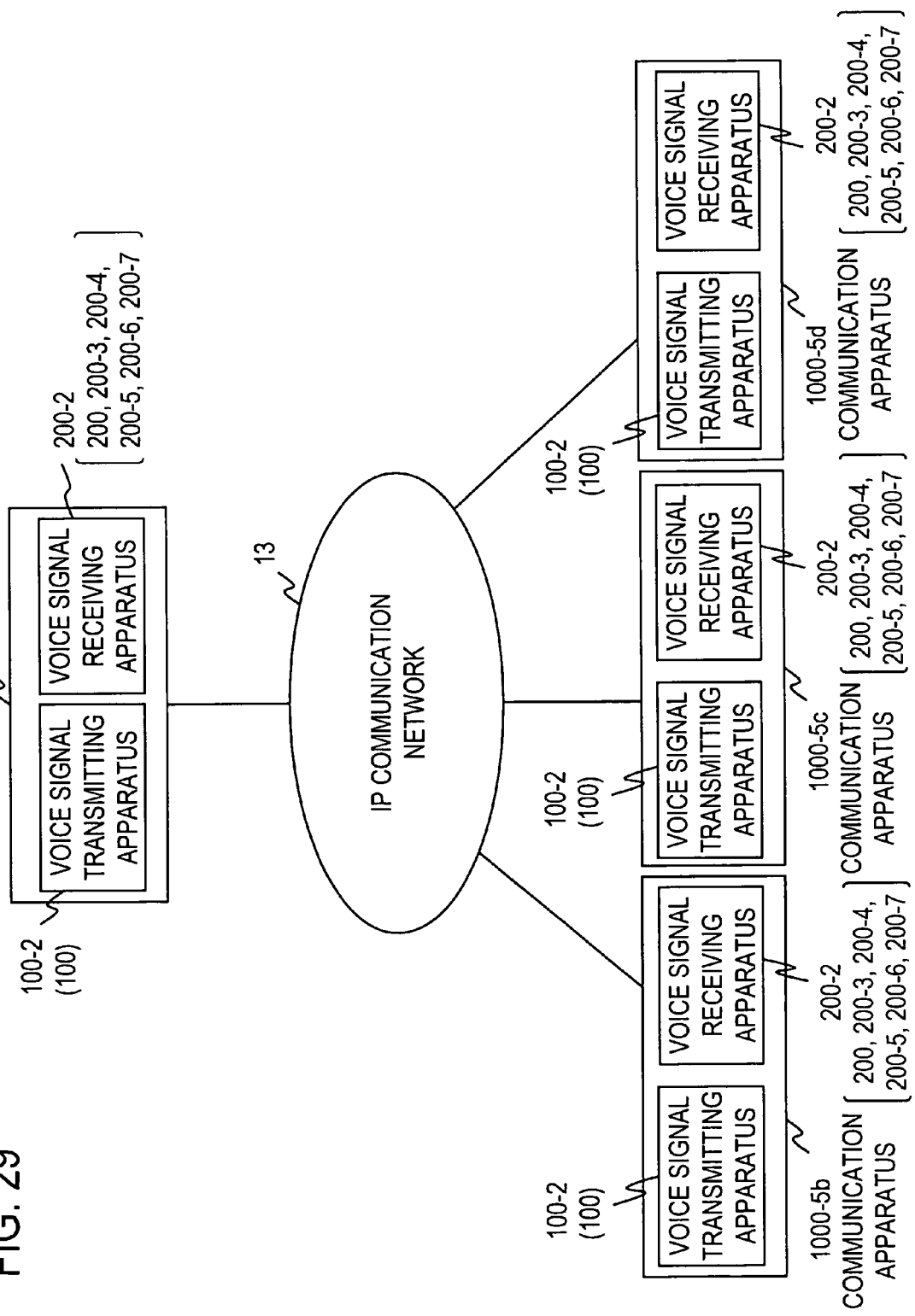
FIG. 29 shows an exemplary system configuration where voice packets are transmitted bidirectionally.

FIG. 29 shows an exemplary system configuration in which voice packets are transmitted bidirectionally. A communication apparatus 100-5 consists of a voice signal transmitting apparatus 100-2 and a voices signal receiving apparatus 200-2. The initial value of the amount of delay and the number of packets to be stored in a receiving buffer may be set to 1, for example. The voice signal transmitting apparatus may be the voice signal transmitting apparatus denoted earlier by reference numeral 100. The voice signal receiving apparatus may be the voice signal receiving apparatus 200, 2000-3, 200-4, 200-5, 200-6, or 200-7.

A process flow in the system configuration described above will be described below. Detailed process flows in the apparatuses will be omitted because they have been described with respect to FIGS. 9 and 10. For example, the process for decoding an acoustic signal and the method for generating a lost frame are performed inevitably in actual apparatuses. However, the detailed processes are not the main part of the present invention and the description of which are omitted.

Figure 30:
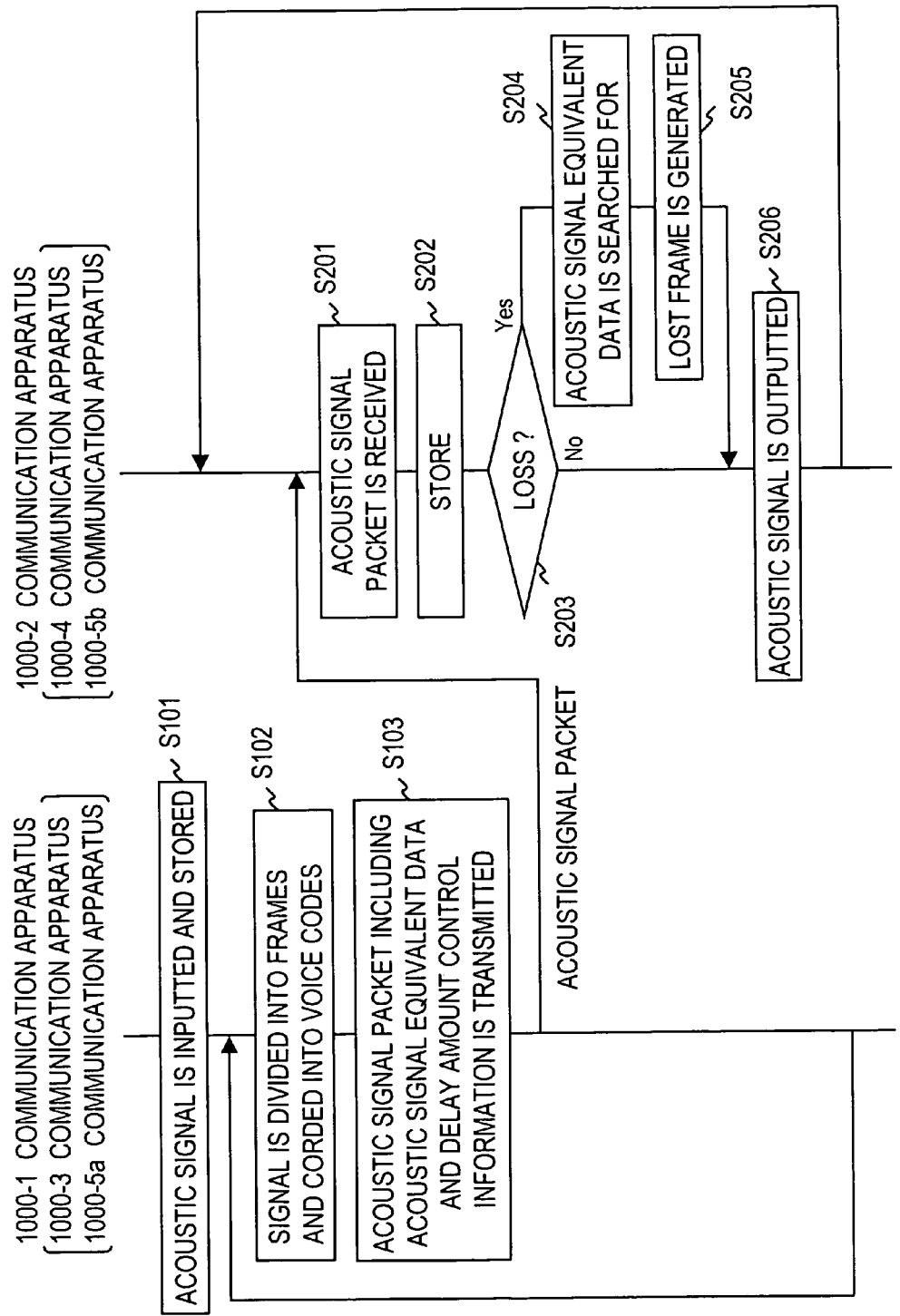
FIG. 30 shows an exemplary process flow for not transmitting a control information from the receiving end of voice packets to the sending end.

FIG. 30 shows a process flow in the case where information for requesting the setting of delay amount control information is not transmitted from a voice packet receiving end to a sending end. The process flow can be applied not only to the system configuration in FIG. 25 but also to the system configurations in FIGS. 26 and 29. When an acoustic signal is inputted into a communication apparatus 1000-1 at the sending end, it is stored in an input buffer 111 (S101). The stored acoustic signal is divided into frames and encoded into voice codes (S102). Then, voice packets containing acoustic signal corresponding data and delay amount control information are constructed and transmitted to the receiving end (S103). In a communication apparatus 1000-2 at the receiving end, the voice packets are received (S201) and stored in a receiving buffer 212 (S202). If a packet loss occurs (S203), a loss handling control unit 217 uses delay amount control information to search for acoustic signal corresponding data (S204) and generates a lost frame (S205). Finally, the acoustic signal is arranged and outputted in the order of frames (S206). If there are multiple sending-end communication apparatuses 1000-1, each of the communication devices 1000-1 can set the amount of delay independently. Also, each of communication apparatuses 1000-5 shown in FIG. 29 can set the amount of delay independently. Therefore, the system has the effect that a common rule about the amount of delay does not need to be established beforehand and the amount of delay can be changed.

FIGS. 31, 32, 33, and 34 show process flows in the case where information for requesting the setting of delay amount control information is transmitted from a voice packet receiving end to a sending end. These process flows can be applied to the system configurations shown in FIGS. 26 and 29.

Figure 31:
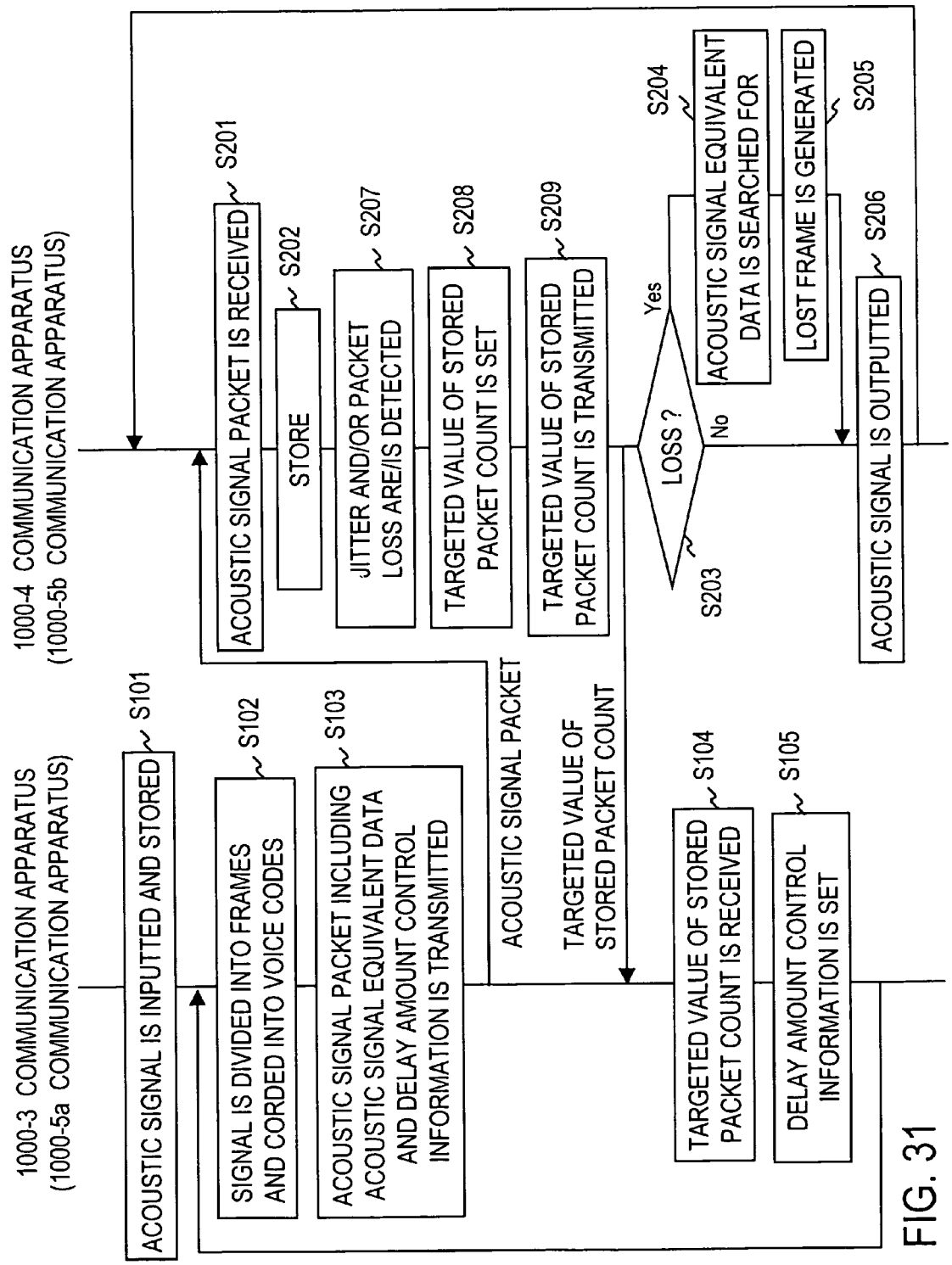
FIG. 31 shows a first example of a process flow for transmitting a control signal from a voice packet receiving end to the sending end.

The process flow in FIG. 31 can be applied to a case where communication apparatus 1000-3 (or 1000-5) at a voice packet sending end has at least a voice signal transmitting apparatus 100-2 and a communication apparatus 1000-4 (or 1000-5) at a voice packet receiving end has at least a voice signal receiving apparatus 200-2 or 200-4. This process flow is characterized in that information for requesting the setting of delay amount control information is determined at the receiving end from jitter time or the number of consecutive packet losses and delay amount control information is obtained from the information for the setting of delay amount control information at the sending end.

At the voice packet sending end, an acoustic signal is inputted into the communication apparatus 1000-3 (step S101) and stored in an input buffer 111 (S102). Voice packets including acoustic signal corresponding data and delay amount control information are constructed and transmitted to the receiving end (S103). In the communication apparatus 1000-4 at the voice packet receiving end, the voice packets are received (S201) and stored in a receiving buffer 212 (S202). Jitter time is detected in a jitter detecting unit 232 (or the number of consecutive packet losses is detected in a loss state determining unit 233) in the receiving-end communication device 1000-4 (S207). A receiving buffer control unit 231 sets the targeted value of the number of the stored packets to a value greater than or equivalent to the jitter time or the number of consecutive packet losses (S208). The target value of the number of stored packets is provided to a transmitting apparatus 300 of the communication apparatus 1000-4 at the voice packet receiving end (or to a voice signal transmitting apparatus 100-2 in the communication apparatus 1000-5) as information for requesting the setting of delay amount control information. Then, the transmitting apparatus 300 (or the voice signal transmitting apparatus 100-2) transmits the targeted value to the communication device 1000-3 (or the communication device 1000-5) at the voice packet sending end as information for requesting the setting of delay amount control information (S209). The communication apparatus 1000-3 at the voice packet sending end receives the information for requesting the setting of delay amount control information (S104). A delay amount control unit 341 sets the value of the delay amount control information to a value less than or equal to the value of the information for requesting the setting of delay amount control information, that is, less than or equal to the targeted value of the number of stored packets and provides it to the voice signal transmitting apparatus 100-2. In the voice signal transmitting apparatus 100-2, the delay amount control information is inputted into a shift buffer 116 and the delay amount control information is set (S105). In the communication apparatus 1000-4 at the voice signal receiving end, determination is made as to whether a packet loss has occurred, a lost frame is generated, and other processing is performed (S203, S204, and S205), and a voice signal is outputted (S206). The process described above has the effect that an optimum number of stored packets and amount of delay can be set in accordance with the ever-changing conditions of the communication network, in addition to the effect of the process flow in FIG. 30.

Figure 32:
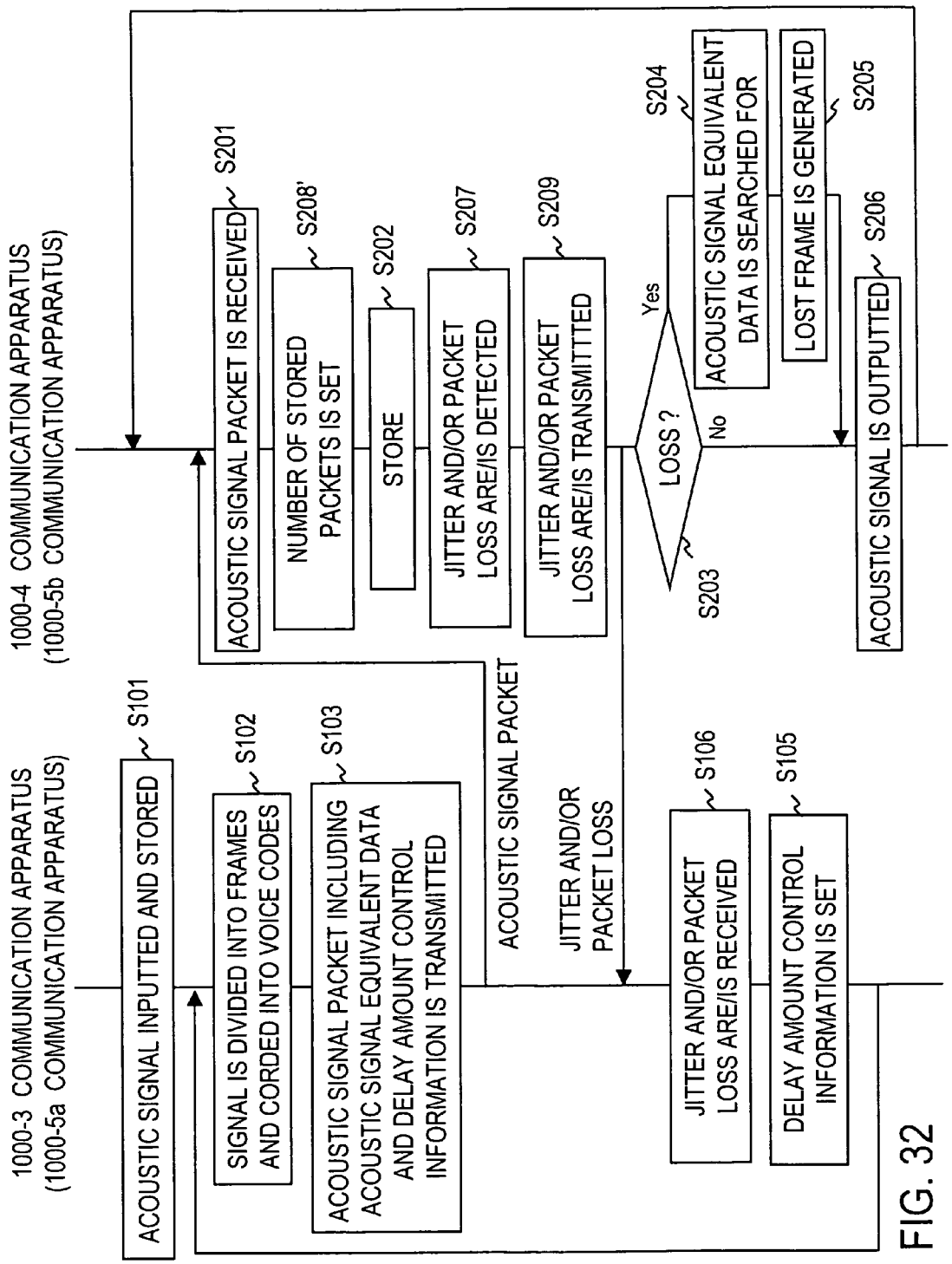
FIG. 32 shows a second example of a process flow for transmitting a control signal from the receiving end of voice packets to the sending end.

The process flow shown in FIG. 32 can be applied to a case where a communication apparatus 1000-3 (or 1000-5) at a voice packet transmitting end includes at least a voice signal transmitting apparatus 100-2 and a communication apparatus 1000-4 (or 1000-5) at a voice packet receiving end includes at least a voice signal receiving apparatus 200-2, 200-4, 200-6, or 200-7. A feature of this process is as follows. The voice packet receiving end detects jitter time or the number of consecutive packet losses and transmits the result to the sending end. The voice packet sending end sets delay amount control information based on the jitter time or the number of consecutive packet losses. The voice packet sending ends transmits the delay amount control information to the receiving end along with a voice signal. The voice packet receiving end sets the number of stored packets based on the received delay amount control information.

Steps S101 to S201 are the same as those of the process flow in FIG. 31. A receiving buffer 212 extracts delay amount control information from a received voice packet and sets the number of stored packets (S208'). Voice packets are stored in the receiving buffer according to the setting (S202). A jitter detecting unit 232 or a loss state determining unit 233 detects jitter time or the number of consecutive packet losses (S207). The detected information is transmitted from a transmitting apparatus 300 in the communication apparatus 1000-4 (or a voice signal transmitting apparatus 100-2 in the communication apparatus 1000-5) at the voice packet receiving end to the communication apparatus 1000-3 (or communication apparatus 1000-5) at the voice packet sending end (S209). The communication apparatus 1000-3 (or communication apparatus 1000-5) at the voice packet sending end receives the information (S106). A delay amount control unit 341 sets the value of the delay amount control information to a value greater than the number of flame equivalent to the jitter time or greater than the number of consecutive packet losses and sends it to the voice signal transmitting apparatus 100-2. In the voice signal transmitting apparatus 100-2, the delay amount control information is inputted into a shift buffer 116 and the delay amount control information is set (S105). Steps S203 to S206 are the same as those of FIG. 31. While in the description of the feature of the process flow the number of stored packets is set last, it is shown before the detection of jitter and the setting of the delay amount control information in the process flowchart in FIG. 32. This is because the process is performed repeatedly and the number of stored packets is determined on the basis of delay amount control information obtained in the previous repetition. This means that the number of stored packets is set last. It should be noted that the initial value of delay amount control information may be set to 1, for example, in the first repetitive process. The effect of the process flow is the same as that of the one shown in FIG. 31.

Figure 33:
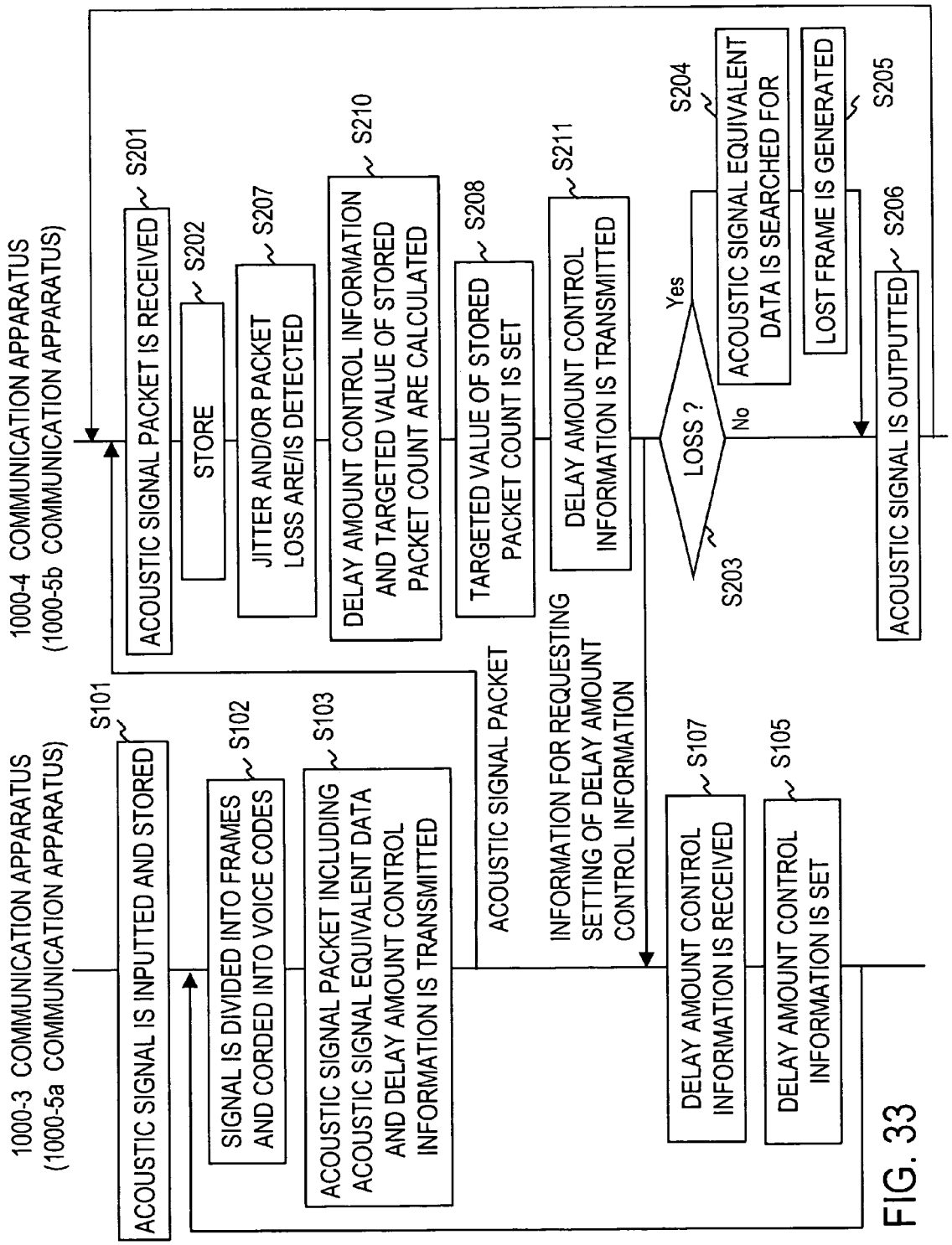
FIG. 33 shows a third example of a process flow for transmitting a control signal from the receiving end of voice packets to the sending end.

The process flow shown in FIG. 33 can be applied to a case where a communication apparatus 1000-3 (or 1000-5) at a voice packet sending end includes at least a voice signal transmitting apparatus 100-2 and a communication apparatus 1000-4 (or 1000-5) at a voice packet receiving end includes at least a voices signal receiving apparatus 200-2 or 200-4. The process is characterized in that the targeted value of the number of stored packets and delay amount control information are obtained at the same time from jitter time or the number of consecutive packet losses.

Steps S101 to S207 are the same as those in FIG. 31. A receiving buffer control unit 231 obtains the number of stored packets and delay amount control information from detected jitter or the number of consecutive packet losses (S210). The values are obtained such that the relation the number of frames equivalent to jitter time (fractions round up)≦amount of delay≦the number of stored packets or the number of consecutive packet losses≦amount of delay≦the number of stored packets is satisfied. A receiving buffer 212 is set so as to store packets in accordance with the obtained targeted value of the number of stored packets (S208). The obtained delay amount control information is transmitted from a transmitting apparatus 300 of the communication apparatus 1000-4 (or a voice signal transmitting apparatus 100-2 of the communication apparatus 1000-5) at the voice packet receiving end to the communication apparatus 1000-3 (or the communication apparatus 1000-5) at the voice packet transmitting end as a request for changing delay amount control information (S211). The information is received by the communication apparatus 1000-3 (or the communication apparatus 1000-5) at the voice packet sending end (S107) and is set as delay amount control information by a delay amount control unit 341. In the voice signal transmitting apparatus 100-2, the delay amount control information is inputted into a shift buffer 116 and the delay amount control information is set (S105). Steps S203 to S206 are the same as those in FIG. 31. The process flow has the same effect as the process flows in FIGS. 31 and 32.

Figure 34:
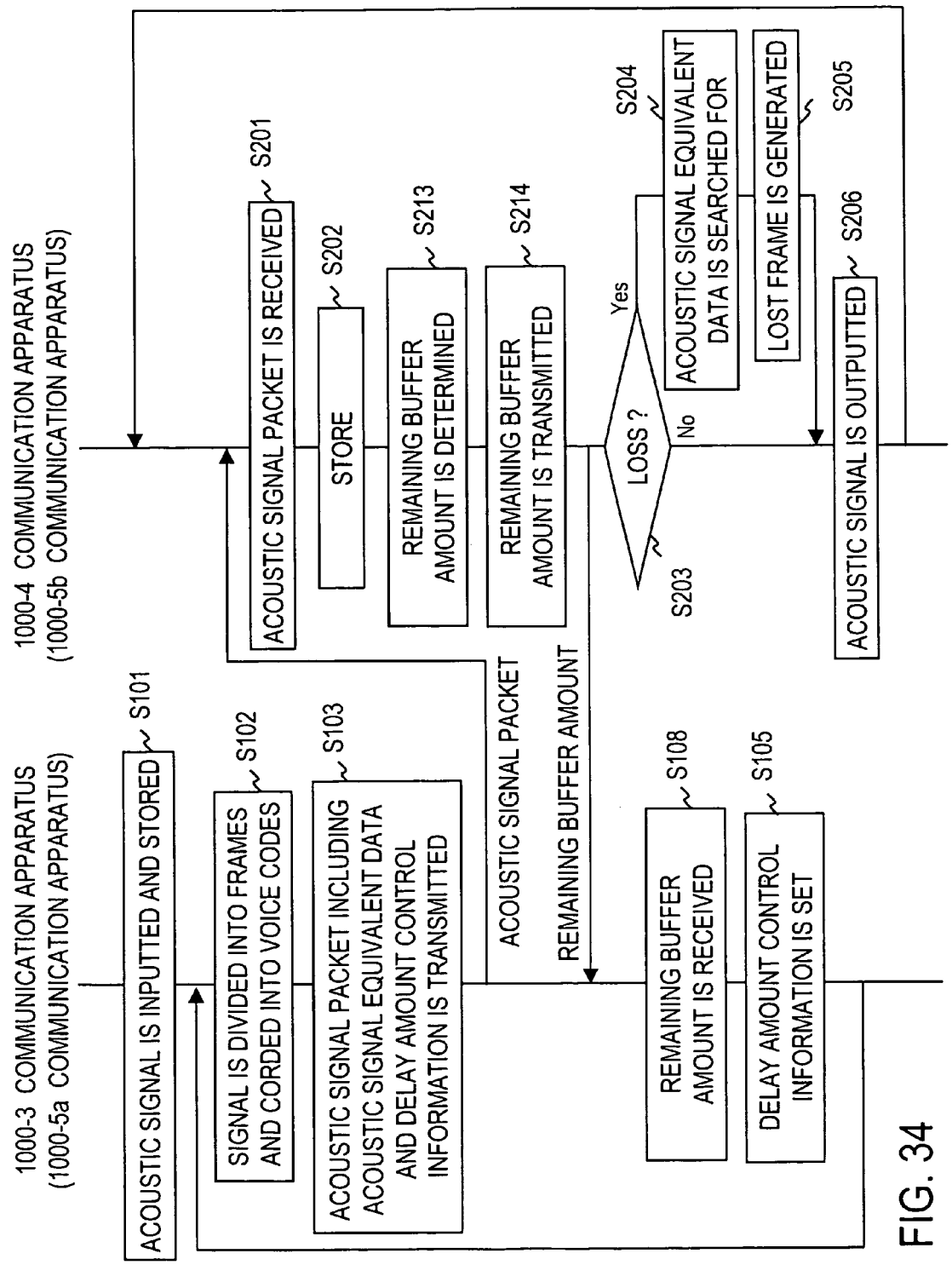
FIG. 34 shows a fourth example of a process flow for transmitting a control signal from the receiving end of voice packets to the sending end.

The process flow shown in FIG. 34 can be applied to a case where a communication apparatus 1000-3 (or 1000-5) at a voice packet sending end includes at least a voice signal transmitting apparatus 100 and a communication apparatus 1000-4 (or 1000-5) at a voice packet receiving end includes at least a voice signal receiving apparatus 200. The process is characterized in that the remaining buffer amount is transmitted as information for requesting the setting of delay amount control information and thereby delay amount control information is obtained.

Steps S101 to S202 are the same as those in FIG. 31. A remaining receiving buffer amount determining unit 218 of the communication apparatus 1000-4 (or the communication apparatus 1000-5) at the voice packet receiving end determines the remaining buffer amount of a receiving buffer (S213). The determined information is transmitted from a transmitting apparatus 300 of the communication apparatus 1000-4 (or a voices signal transmitting apparatus 100-2 of the communication apparatus 1000-5) at the voice packet receiving end to the communication apparatus 1000-3 (or the communication apparatus 1000-5) at the voice packet sending end (S214). The communication apparatus 1000-3 (or the communication apparatus 1000 at the voice packet sending end receives the remaining buffer amount information (S108). A delay amount control unit 341 (or a remaining buffer amount decoding unit 216) obtains delay amount control information that is less than or equal to the remaining buffer amount. In the voices signal transmitting apparatus 100-2, the delay amount control information is inputted into a shift buffer 116 and the delay amount control information is set (S105). Steps S203 to S206 are the same as those in FIG. 31. The process flow has the same effect as the processes shown in FIGS. 31, 32, and 33.

Figure 35:
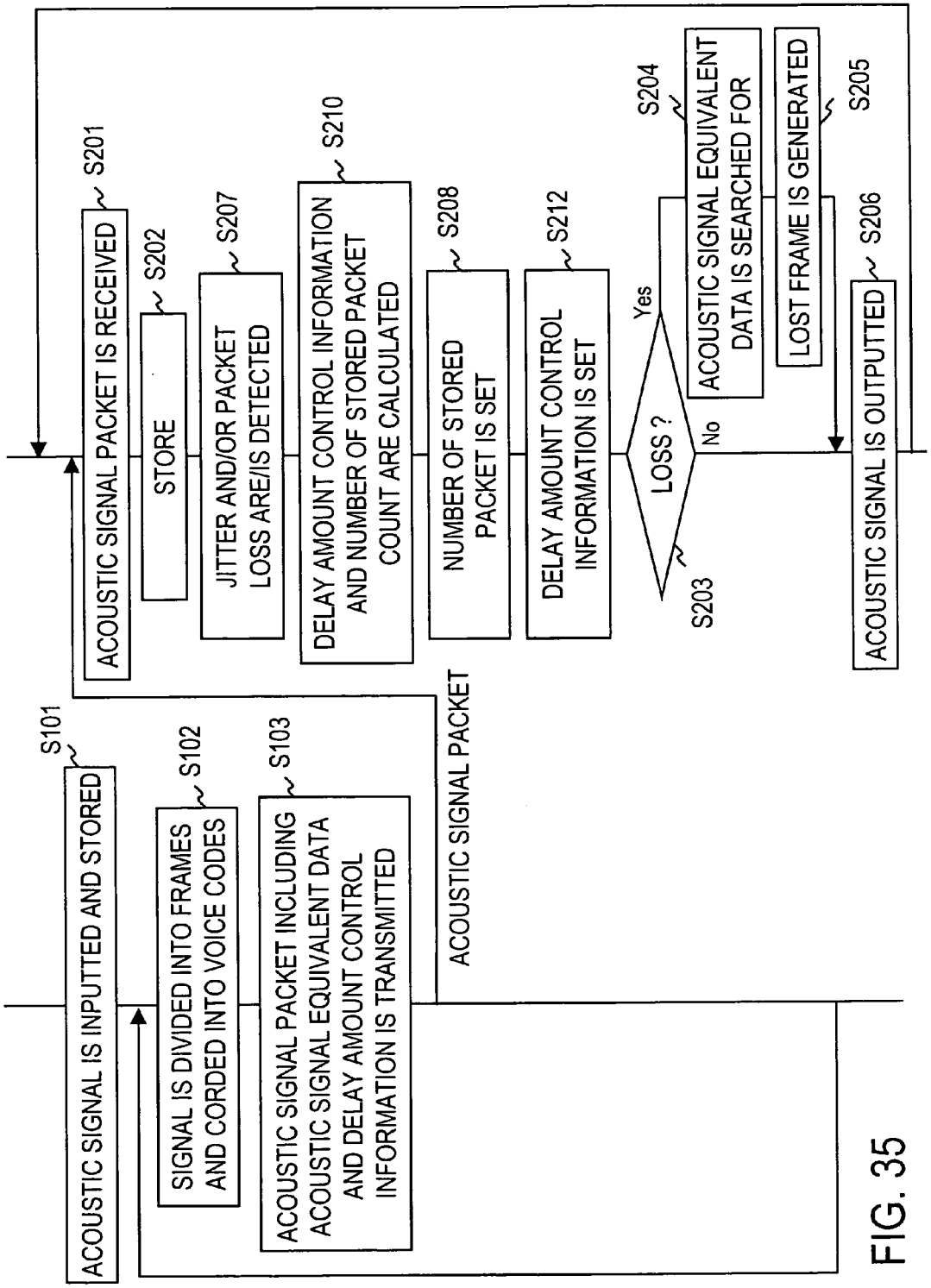
FIG. 35 shows an exemplary process flow in which the conditions of a communication network equally affect packet communications in both directions.

FIG. 35 shows a process flow in which it is assumed that the conditions of the network equally affect packet communication in both directions when bidirectional packet communication is performed. This process flow can be applied to the system configuration shown in FIG. 29. This process is characterized in that the number of stored packets to be received and voice packet delay amount control information are obtained from jitters of received voice packets and the number of consecutive packet losses. Steps S101 to S208 are the same as those in FIG. 33. Obtained delay amount control information is inputted into a shift buffer 116 of a voice signal transmitting apparatus 100-2 and the delay amount control information is set (S212). This process flow has the effect of reducing the number of steps for controlling communication apparatuses, in addition to the effect of the processes in FIGS. 31, 32, and 33.

Each of the apparatuses shown in FIGS. 17, 18, 20-24, 27, and 28 may be caused to function by a computer. The steps of the processes shown in FIGS. 30 to 35 may be performed by a computer using a program. The program may be installed in a computer from a recording medium such as a CD-ROM, a magnetic disk, or a semiconductor storage, or may be downloaded through a communication network.

What is claimed is:

1. An acoustic signal packet communicating system including a first communication apparatus including a processor and both a transmitting unit and a receiving unit and a second communication apparatus including a processor and both a transmitting unit and a receiving unit, comprising:

in the transmitting unit in the first communication apparatus:

a dividing unit, implemented by a processor, that divides an acoustic signal such as a voice or music signal into given time segments called frames to generate frame acoustic signals in association with respective frame numbers;

a generating unit, implemented by a processor, that generates, from each frame acoustic signal, acoustic signal corresponding data as data corresponding to the frame acoustic signal;

a containing unit, implemented by a processor, that contains, in each packet, a frame acoustic signal of a current frame, an acoustic signal corresponding data of a past frame preceding the current frame by a difference between the frame numbers of the current frame and the past frame and a delay amount control information indicating the difference; and a transmitter that transmits the packet; and the acoustic signal packet communicating system further comprises:

in the receiving unit in the second communication apparatus:

a receiving buffer for storing therein received packets;

a loss detecting unit, implemented by a processor, that determines whether or not a packet containing a frame acoustic signal associated with the number of the frame to be extracted is stored in the receiving buffer;

an acoustic signal packet decoding unit, implemented by a processor, that, when it is determined in the loss detecting unit that the packet containing the frame acoustic signal associated with the frame number of the frame to be extracted is stored in the receiving buffer, extracts the frame acoustic signal from the packet stored in the receiving buffer and provides the frame acoustic signal as a frame output acoustic signal;

a loss handling unit, implemented by a processor, that, when a packet loss occurs as determined in the loss detecting unit that the packet containing the frame acoustic signal associated with the frame number of the frame to be extracted is not stored in the receiving buffer, extracts an acoustic signal corresponding data for the frame as a lost frame, from a packet stored in the receiving buffer and generating a frame output acoustic signal by using the acoustic signal corresponding data; and a generating unit, implemented by a processor, that generates, as a reproduced acoustic signal, frame output acoustic signals outputted from the acoustic signal packet decoding unit or the loss handling unit and outputs the reproduced acoustic signal;

said loss handling unit in the receiving unit is configured to obtain, when a packet loss occurs, acoustic signal corresponding data having the same frame number as that of a lost frame from the packet in the receiving buffer by using the delay amount control information included in the packet;

the receiving unit in the second communication apparatus further comprises:

a jitter and loss determining unit, implemented by a processor, that determines at least one of a jitter state of a received packet and a loss state of a received packet;

a packet number determining unit, implemented by a processor, that determines as a targeted value of the number of stored packets, the number of packets to be stored in the receiving buffer by using the result of the determination made by the jitter and loss determining unit; and a sending unit, implemented by a processor, that sends the targeted value of the number of stored packets to the transmitting unit in the second communication apparatus; and the transmitting unit in the second communication apparatus comprises:

a containing unit, implemented by a processor, that contains the targeted value of the number of stored packets sent from the receiving unit in the second communication apparatus in a packet as information for specifying delay amount control information to be set in the transmitting unit in the first communication apparatus; and the transmitting unit in the first communication apparatus comprises:

a setting unit, implemented by a processor, that sets delay amount control information to a value smaller than or equal to the targeted value of the number of stored packets contained in a packet sent from the transmitting unit in the second communication apparatus.

2. An acoustic signal packet communicating system including a first communication apparatus including a processor and both a transmitting unit and a receiving unit and a second communication apparatus including a processor and both a transmitting unit and a receiving unit, comprising:

in the transmitting unit in the first communication apparatus:

a dividing unit, implemented by a processor, that divides an acoustic signal such as a voice or music signal into given time segments called frames to generate frame acoustic signals in association with respective frame numbers and generates, from each frame acoustic signal, acoustic signal corresponding data as data corresponding to the frame acoustic signal; and a containing unit, implemented by a processor, that contains, in each packet, a frame acoustic signal of a current frame, an acoustic signal corresponding data of a past frame preceding the current frame by a difference between the frame numbers of the current frame and the past frame and a delay amount control information indicating the difference and transmitting the packet; and in the receiving unit in the second communication apparatus:

a receiving buffer for storing therein received packets;

a loss detecting unit, implemented by a processor, that determines whether or not a packet containing a frame acoustic signal associated with the number of the frame to be extracted is stored in the receiving buffer;

an acoustic signal packet decoding unit, implemented by a processor, that, when it is determined in the loss detecting unit that the packet containing the frame acoustic signal associated with the frame number of the frame to be extracted is stored in the receiving buffer, extracts the frame acoustic signal from the packet stored in the receiving buffer and provides the frame acoustic signal as a frame output acoustic signal;

a loss handling unit, implemented by a processor, that, when a packet loss occurs as determined in the loss detecting unit that the packet containing the frame acoustic signal associated with the frame number of the frame to be extracted is not stored in the receiving buffer, extracts an acoustic signal corresponding data for the frame as a lost frame, from a packet stored in the receiving buffer and generates a frame output acoustic signal by using the acoustic signal corresponding data; and a generating unit, implemented by a processor, that generates, as a reproduced acoustic signal, frame output acoustic signals outputted from the acoustic signal packet decoding unit or the loss handling unit and outputs the reproduced acoustic signal;

said loss handling unit in the receiving unit is configured to obtain, when a packet loss occurs, acoustic signal corresponding data having the same frame number as that of a lost frame from the packet in the receiving buffer by using the delay amount control information included in the packet;

the receiving unit in the second communication apparatus further comprises:

a measuring unit, implemented by a processor, that measures, as a remaining buffer amount, the number of packets stored in the receiving buffer; and a sending unit, implemented by a processor, that sends the remaining buffer amount to the transmitting unit in the second communication apparatus;

the transmitting unit in the second communication apparatus comprises:

a containing unit, implemented by a processor, that contains the remaining buffer amount sent from the receiving unit in the second communication apparatus in a packet as information for specifying delay amount control information to be set in the transmitting unit in the first communication apparatus and transmitting the packet; and the transmitting unit in the first communication apparatus comprises:

a setting unit, implemented by a processor, that sets delay amount control information to the remaining buffer amount contained in a packet sent from the transmitting unit in the second communication apparatus.

3. An acoustic signal packet communicating apparatus comprising:

a processor;

a transmitting unit having:

a dividing unit, implemented by a processor, that divides an acoustic signal such as a voice or music signal into given time segments called frames to generate frame acoustic signals in association with respective frame numbers; and a generating unit, implemented by a processor, that generates from each frame acoustic signal, acoustic signal corresponding data as data corresponding to the frame acoustic signal;

a containing unit, implemented by a processor, that contains, in each packet, a frame acoustic signal of a current frame, an acoustic signal corresponding data of a past frame preceding the current frame by a difference between the frame numbers of the current frame and the past frame and a delay amount control information indicating the difference; and a transmitter that transmits the packets; and a receiving unit having:

a receiving buffer for storing therein received packets;

a loss detecting unit, implemented by a processor, that determines whether or not a packet containing a frame acoustic signal associated with the number of the frame to be extracted is stored in the receiving buffer;

an acoustic signal packet decoding unit, implemented by a processor, that, when it is determined in the loss detecting unit that the packet containing the frame acoustic signal associated with the frame number of the frame to be extracted is stored in the receiving buffer, extracts the frame acoustic signal from the packet stored in the receiving buffer and provides the frame acoustic signal as a frame output acoustic signal;

a loss handling unit, implemented by a processor, that, when a packet loss occurs as determined in the loss detecting unit that the packet containing the frame acoustic signal associated with the frame number of the frame to be extracted is not stored in the receiving buffer, extracts an acoustic signal corresponding data for the frame as a lost frame, from a packet stored in the receiving buffer and generates a frame output acoustic signal by using the acoustic signal corresponding data; and a generating unit, implemented by a processor, that generates, as a reproduced acoustic signal, frame output acoustic signals outputted from the acoustic signal packet decoding unit or the loss handling unit and outputs the reproduced acoustic signal;

said loss handling unit in the receiving unit is configured to obtain, when a packet loss occurs, acoustic signal corresponding data having the same frame number as that of a lost frame from the packet in the receiving buffer by using the delay amount control information included in the packet;

the receiving unit further comprises a jitter and loss determining unit, implemented by a processor, that determines at least one of a jitter state of a received packet and a loss state of a received packet and packet number determining unit, implemented by a processor, that determines, as the targeted value of the number of stored packets, the number of packets to be stored in a receiving buffer by using the result of the determination made by the jitter and loss determining unit; and the transmitting unit further comprises a setting unit, implemented by a processor, that sets the delay amount control information to a value less than or equal to the targeted value of the number of stored packets.

* * * * *